United States Patent
Ishikawa et al.

(10) Patent No.: US 10,203,234 B2
(45) Date of Patent: Feb. 12, 2019

(54) ULTRASONIC FLOW SENSOR AND TEMPERATURE MEASURING METHOD USING THE SAME

(71) Applicant: KEYENCE CORPORATION, Osaka-shi, Osaka (JP)

(72) Inventors: Daishiro Ishikawa, Osaka (JP); Daiki Matsumoto, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 15/819,506

(22) Filed: Nov. 21, 2017

(65) Prior Publication Data
US 2018/0209830 A1 Jul. 26, 2018

(30) Foreign Application Priority Data
Jan. 26, 2017 (JP) ................................. 2017-012043

(51) Int. Cl.
*G01F 1/66* (2006.01)
*G01K 1/14* (2006.01)

(52) U.S. Cl.
CPC ............. *G01F 1/662* (2013.01); *G01K 1/143* (2013.01)

(58) Field of Classification Search
CPC ........................................................ G01F 1/66
See application file for complete search history.

(56) References Cited

U.S. PATENT DOCUMENTS

| 7,373,839 | B2 | 5/2008 | Wiest et al. | |
| 8,267,365 | B2 | 9/2012 | Wiest et al. | |
| 2015/0377691 | A1* | 12/2015 | Ceglia | G01F 1/66 73/1.16 |
| 2017/0102253 | A1* | 4/2017 | Ye | G01F 1/662 |
| 2017/0343397 | A1* | 11/2017 | Ye | G01F 1/662 |

FOREIGN PATENT DOCUMENTS

| JP | 61-6725 | 1/1986 |
| JP | 5-72011 | 3/1993 |
| JP | 10-213467 | 8/1998 |
| JP | 10-221137 | 8/1998 |
| JP | 2000-46607 | 2/2000 |
| WO | WO 99/0172 A1 | 1/1999 |

OTHER PUBLICATIONS

U.S. Appl. No. 15/819,480, filed Nov. 21, 2017, Kazuhiro Making et al., Keyence Corporation.

* cited by examiner

*Primary Examiner* — Jewel V Dowtin

(57) ABSTRACT

To add a function of detecting a temperature to an ultrasonic flow sensor without making the structure of the ultrasonic flow sensor complicated. A sensor portion of the ultrasonic flow sensor includes an acoustic coupling member. The sensor portion includes a heat transfer member having a heat detecting surface for detecting heat of piping. The temperature of heat transferred in the heat transfer member via the heat detecting surface is detected by a temperature detecting device. The heat transfer member restricts an amount of collapse of the acoustic coupling member in a radial direction of the piping when the sensor portion is fixed to the piping.

12 Claims, 25 Drawing Sheets

ULTRASONIC FLOW SENSOR AND TEMPERATURE MEASURING METHOD USING THE SAME

CROSS-REFERENCE TO RELATED APPLICATIONS

The present application claims foreign priority based on Japanese Patent Application No. 2017-012043, filed Jan. 26, 2017, the contents of which is incorporated herein by reference.

BACKGROUND OF THE INVENTION

1. Field of the Invention

The present invention relates to an ultrasonic flow sensor and a temperature measuring method using the same.

2. Description of Related Art

Ultrasonic flow sensors are used for measuring a flow rate of a fluid flowing in piping. JP-A-2000-46607 discloses a clamp-on ultrasonic flow sensor which enables retrofitting on an outer peripheral surface of the piping, and a fitting thereof. The fitting enables the clamp-on ultrasonic flow sensor to be fixed to piping having various diameters.

JP-A-2000-46607 discloses embodiments in which first and second sensor units are arranged in a V-shape and in a Z-shape. In the V-shaped arrangement, the first and second sensor units are installed on a first mother line of piping at first and second positions apart from each other along a direction of longitudinal axis of the piping. In the V-shaped arrangement, the first sensor unit is disposed at the first position on the first mother line of the piping, and the second sensor unit is installed on the second mother line that opposes the first mother line in a diameter direction at the second position apart from the first position along the direction of the longitudinal axis of the piping.

The fitting disclosed in JP-A-2000-46607 is fixed to the piping with a band. The two sensor portions are accommodated in the fitting for the V-shaped arrangement. In other words, the fitting for the V-shaped arrangement disclosed in JP-A-2000-46607 is configured to position the first and second sensor units at positions apart from each other along the direction of the longitudinal axis of the piping with a single fitting. The fitting in which the two sensor portions are accommodated is fixed to the piping with the band, so that the first and second sensor units are arranged in the V-shape.

A single sensor unit is accommodated in the fitting for the Z-shaped arrangement. Two of such fittings are provided and each fitting is fixed to the piping with a band. The first fitting is then positioned at the first position on the first mother line of the piping, and the second fitting is positioned on the second mother line opposing the first mother line in the diameter direction at the second position apart from the first position along the direction of the longitudinal axis of the piping, so that the first and second sensor units are arranged in the Z-shape.

SUMMARY OF THE INVENTION

In addition to a request for knowing a flow rate of a fluid flowing in piping, there is also a request for knowing a temperature of the fluid. For example, to deal with a request for calculation of calories (the temperature of a fluid flowing in the piping x the flow rate of the fluid) for adjusting temperature in the tank, a contact terminal of a temperature sensor is additionally installed on the piping in the related art.

It is an object of the present invention to provide an ultrasonic flow sensor including a function for detecting temperatures added to the ultrasonic flow sensor without making the structure of the ultrasonic flow sensor complicated.

The technical object described above is achieved by a first aspect of the invention. The first aspect of the invention provides an ultrasonic flow sensor including: a first ultrasonic device which performs at least one of transmission of ultrasonic waves to a fluid flowing in piping and reception of ultrasonic waves from the fluid flowing in the piping; a second ultrasonic device which performs at least the other one of transmission of ultrasonic waves to a fluid flowing in piping and reception of ultrasonic waves from the fluid flowing in the piping; optionally, for example, a calculation part configured to calculate a flow rate of the fluid in the piping by obtaining a time difference between times required for ultrasonic waves to propagate from an upstream side to a downstream side and from the downstream side to the upstream side of the fluid flowing in the piping based on an output signal from the first ultrasonic device and the second ultrasonic device; and optionally, an output part configured to output an ON/OFF signal relating to the flow rate of the fluid flowing in the piping based on the flow rate calculated by the calculation part and a predetermined flow rate threshold value, including: a sensor portion including at least one of the first ultrasonic device and the second ultrasonic device integrated therein, and including a solid-state acoustic coupling member capable of elastic deformation and configured to come into contact with the piping; and a fixing member configured to position and fix the sensor portion with respect to the piping, wherein the sensor portion includes: a heat transfer member having a heat detecting surface configured to come into contact with an outer peripheral surface of the piping when the sensor portion is fixed to the piping by the fixing member and detect heat of the piping; a temperature detecting device configured to detect a temperature of heat transferred in the heat transfer member via the heat detecting surface; and a temperature measuring part configured to measure the temperature of the heat detecting surface based on a detection signal from the temperature detecting device, and the heat transfer member restricts an amount of collapse of the acoustic coupling member in a radial direction of the piping when the sensor portion is fixed to the piping by the fixing member.

The technical object described above is achieved by a second aspect of the invention. The second aspect of the invention provides an ultrasonic flow sensor including: a first ultrasonic device which performs at least one of transmission of ultrasonic waves to a fluid flowing in piping and reception of ultrasonic waves from the fluid flowing in the piping; a second ultrasonic device which performs at least the other one of transmission of ultrasonic waves to a fluid flowing in piping and reception of ultrasonic waves from the fluid flowing in the piping; optionally, for example, a calculation part configured to calculate a flow rate of the fluid in the piping by obtaining a time difference between times required for ultrasonic waves to propagate from an upstream side to a downstream side and from the downstream side to the upstream side of the fluid flowing in the piping based on output signals from the first ultrasonic device and the second ultrasonic device; and optionally, an output part configured to output an ON/OFF signal relating to the flow rate of the fluid flowing in the piping based on the flow rate calculated by the calculation part and a predetermined flow rate threshold value, including: a sensor portion including at least one of the first ultrasonic device and the second ultrasonic device integrated therein and opposing the piping via an acoustic coupling member; and a fixing member configured to position and fix the sensor portion with respect to the piping, wherein the sensor portion includes: a heat transfer member having a heat detecting surface configured to come into contact with an outer peripheral surface of the piping when the sensor portion is fixed to the piping by the fixing member and detect heat of the piping; a temperature detecting device configured to detect a temperature of heat transferred in the heat transfer member via the heat detecting surface; and a temperature measuring part configured to measure the temperature of the heat detecting surface based on a detection signal from the temperature detecting device, and the heat transfer member positions a sensor surface of the sensor portion in a radial direction of the piping when the sensor portion is fixed to the piping by the fixing member.

In other words, in the invention, the heat detecting surface is provided on the sensor surface facing the piping of the sensor unit provided originally in the ultrasonic flow sensor so that heat communication between the heat detecting surface and the temperature measuring part integrated in the sensor unit is achieved by the heat transfer member.

The detected temperature may be displayed on the display unit of the sensor unit. The display unit preferably displays, for example, the temperature and the flow rate adjacent to each other.

Other objects and advantageous effects of the invention will be apparent from detailed description of a preferred first embodiment of the invention below.

DESCRIPTION OF EMBODIMENTS

Figure 1:
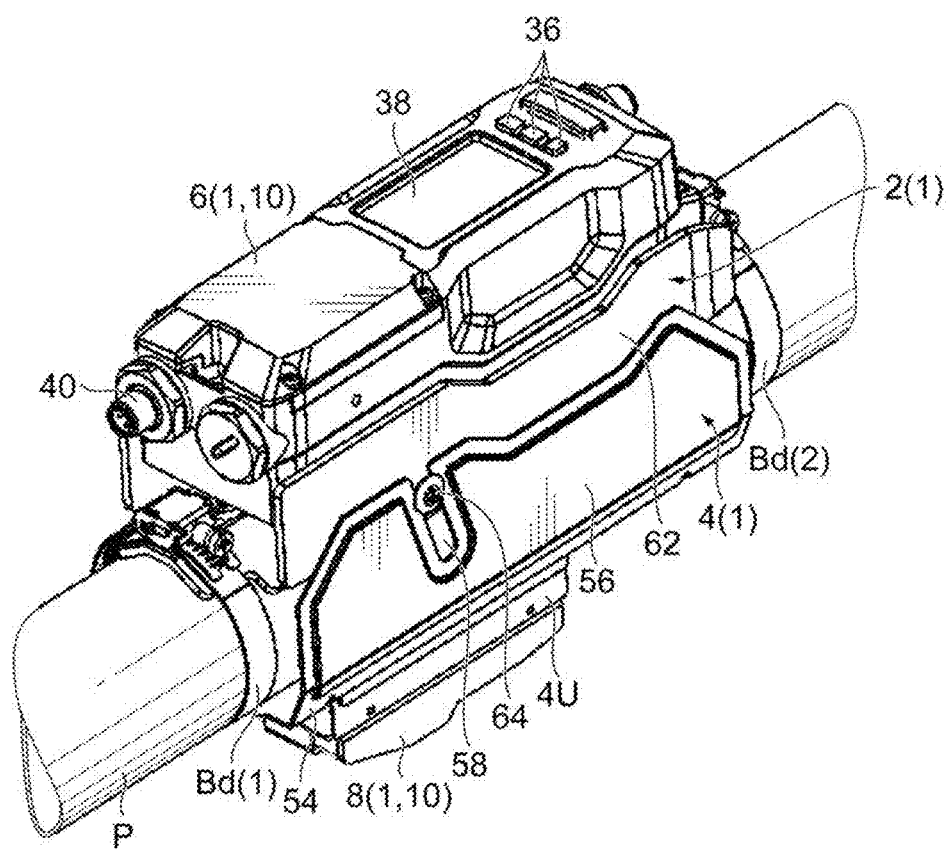
FIG. 1 is a perspective view of an ultrasonic flow sensor system of a first embodiment installed on piping.

Referring to attached drawings, the present invention will be described below.

First Embodiment (FIG. 1 to FIG. 11)

A first embodiment illustrates an ultrasonic flow sensor system 1 typically suitable for a Z-shaped arrangement. However, the first embodiment may be applied to a V-shaped arrangement. The ultrasonic flow sensor system 1 includes first and second fittings (fixtures) 2 and 4, and first and second sensor units 6 and 8 may be attached to a peripheral surface of piping P by using the two fittings 2 and 4. The first and second fittings 2 and 4 are molds and specifically, metallic press molds. The first and second sensor units 6 and 8 constitute an ultrasonic flow sensor 10. The diameter of the piping P and the fluid flowing in the piping P are not specifically limited for the application of the first embodiment. However, a typical example of application will be listed below.

(1) Diameter of Piping P: approx. 44 mm to approx. 100 mm (suitable diameter of the piping P: approx. 48 mm to approx. 90 mm).

(2) Material of Piping P: steel, SUS, copper, polyvinyl Chloride (PVC)

(3) Fluid: water, oil, drug solution, antifreeze (ethylene glycol), coolant

The ultrasonic flow sensor system 1 including the first and second fittings 2 and 4 is configured to be capable of automating various types of positioning relating to the first and second sensor units 6 and 8 to be installed on a peripheral surface of the piping P having given diameter as listed below.

(a) Positioning of the first sensor unit 6 may be automatically achieved by fixing the first fitting 2 to the piping P. With this positioning, the first sensor unit 6 may be oriented in the diameter direction passing through the center of the piping P. (Positioning of First sensor unit 6 in the diameter direction)

(b) Positioning of the second sensor unit 8 may be automatically achieved by fixing the second fitting 4 to the piping P. With this positioning, the second sensor unit 8 may be oriented in the diameter direction passing through the center of the piping P. (Positioning of Second sensor unit 8 in the diameter direction)

(c) The longitudinal axis of the first fitting 2 may be automatically aligned with a first mother line GL1 by fixing the first fitting 2 to the piping P.

(d) The longitudinal axis of the second fitting 4 may be automatically aligned with a second mother line GL2 by fixing the second fitting 4 to the piping P.

(e) The first and second fittings 2 and 4 have a function to convert first information to second information, and the information conversion mechanism is achieved by cooperation of the first and second fittings 2 and 4. The first information is information on the diameter of the piping P. The second information is information on adequate distance between the first and second fittings 2 and 4 along the direction of the longitudinal axis of the piping P. (Proper Calculation of Distance between first and second sensor units 6 and 8 in the axial direction)

(f) In this manner, when the first and second fittings 2 and 4 are fixed to the piping P, the longitudinal axes of the first and second fittings 2 and 4 are automatically aligned with the first mother line GL1 and the second mother line GL2 respectively. The first and second fittings 2 and 4 have a function to position the first sensor unit 6 on the first mother line GL1 (FIG. 3) and position the second sensor unit 8 on the second mother line GL2 (FIG. 3) at an adequate distance from the first sensor unit 6 in the axial direction of the piping P due to interaction therebetween.

In other words, assembly of the first and second sensor units 6 and 8 to the piping P using the first and second fittings 2 and 4 may be figured out in the following three phases.

A first phase includes steps (a) and (b), and steps (c) and (d) described above. The first phase includes positioning of the first and second fittings 2 and 4 in the diameter direction of the piping P by pressing the first and second fittings 2 and 4 against the piping P (steps (a) and (b)), then aligning the orientation in the longitudinal direction of the first and second fittings 2 and 4 with the axial direction of the piping P (steps (c) and (d)).

A second phase includes the step (e) described above. The second phase includes sliding the first and second fittings 2 and 4 in the axial direction of the piping P by using the guide portion or the information conversion mechanism, thereby adjusting the relative position between the first and second fittings 2 and 4 in the axial direction of the piping P.

A third phase includes the step (f) described above. The third phase includes fixing the first and second fittings 2 and 4 to the piping P with a band. The band may be a band which binds the first and second fittings 2 and 4 together or may be bands which fix the first fitting 2 and the second fitting 4 individually and independently. With the third phase, the relative positioning between the first and second fittings 2 and 4 in the axial direction of the piping P is achieved.

Figure 4:
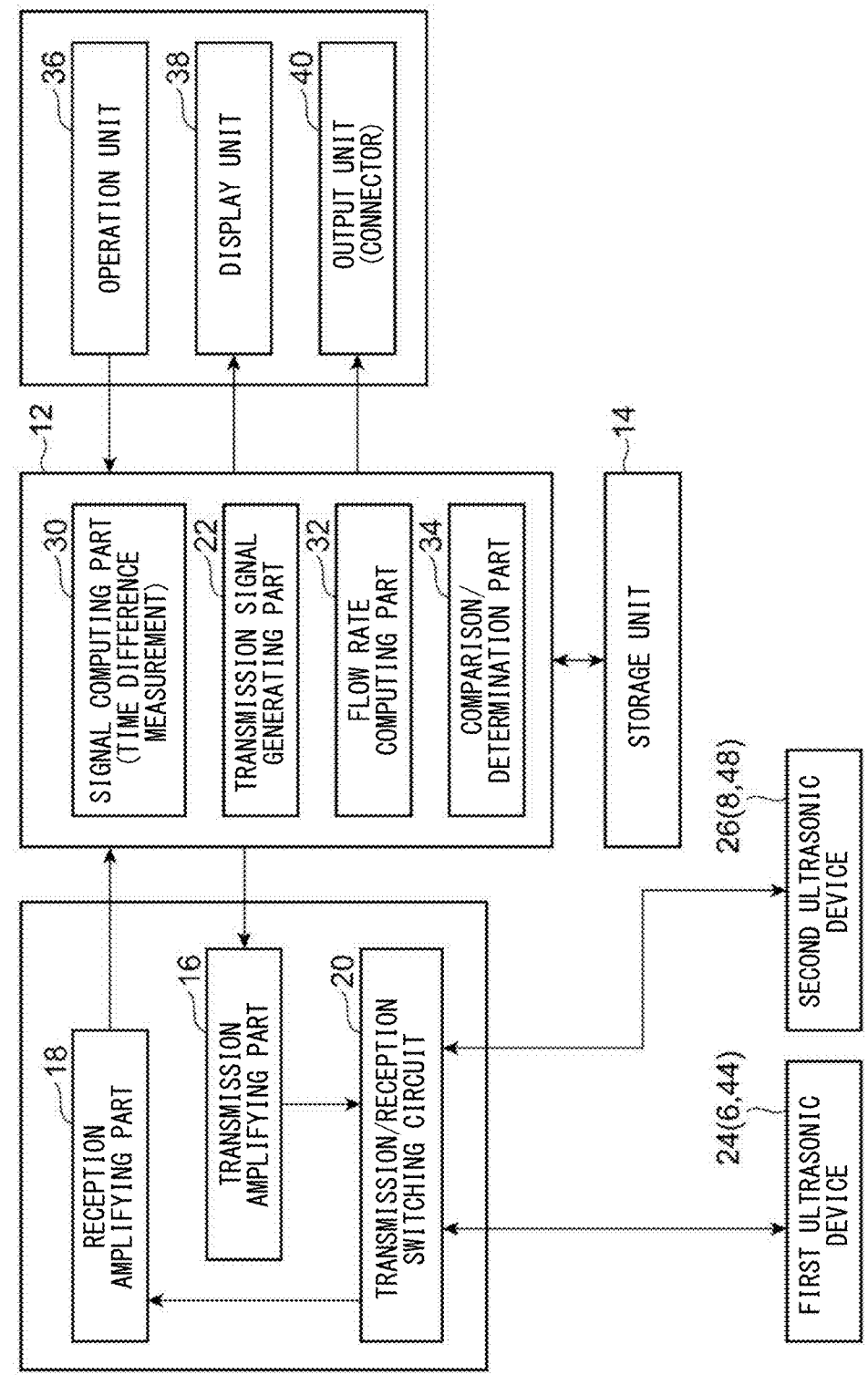
FIG. 4 is a functional bock diagram of an ultrasonic flow sensor included in the ultrasonic flow sensor system of the first embodiment.

FIG. 4 is a functional block diagram of the ultrasonic flow sensor 10. Referring to FIG. 4, the ultrasonic flow sensor 10 includes a control unit 12, and also includes a storage unit 14, a transmission amplifying part 16, and a reception amplifying part 18. The transmission amplifying part 16 and the reception amplifying part 18 are connected to a transmission/reception switching circuit 20.

An analogue signal generated by a transmission signal generating part 22 included in the control unit 12 is supplied to first and second ultrasonic devices 24 and 26 through the transmission amplifying part 16 and through the transmission/reception switching circuit 20, and then the first and second ultrasonic devices 24 and 26 generate ultrasonic wave. The first ultrasonic device 24 is included in the first sensor unit 6. The second ultrasonic device 26 is included in the second sensor unit 8.

The ultrasonic wave generated from the first sensor unit 6 (first ultrasonic device 24) enters a fluid flowing in the piping P. The ultrasonic wave propagated in the fluid is received by the second sensor unit 8 (second ultrasonic device 26), and the second ultrasonic device 26 outputs an analogue signal based on the received ultrasonic wave. The analogue signal output from the second ultrasonic device 26 is supplied to the reception amplifying part 18 through the transmission/reception switching circuit 20.

The reception amplifying part 18 amplifies the analogue signal received from the transmission/reception switching circuit 20 and converts the amplified analogue signal to a digital signal by an A/D conversion circuit. The digital signal is supplied to the control unit 12.

Figure 3:
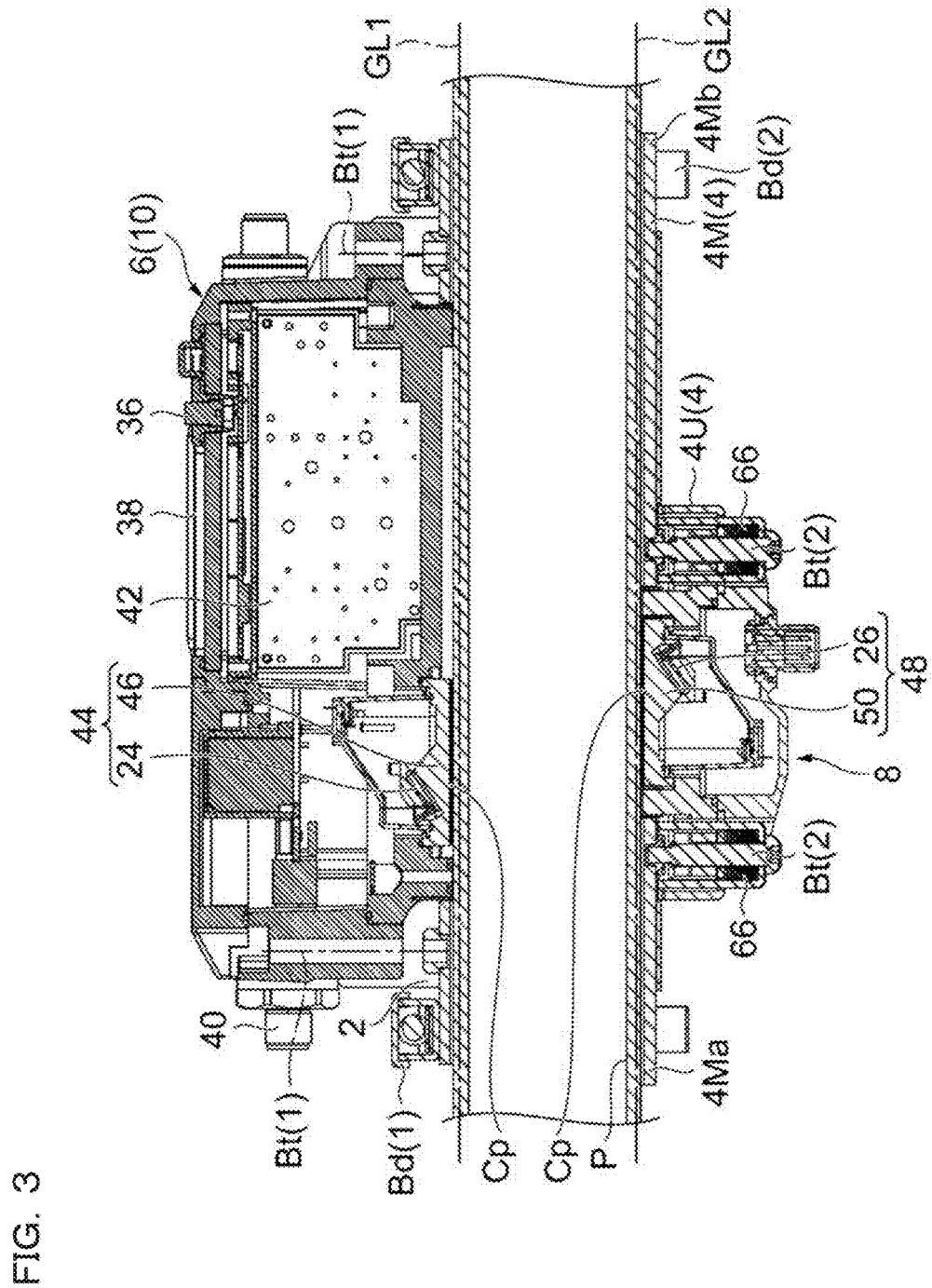
FIG. 3 is a cross-sectional view of the ultrasonic flow sensor system of the first embodiment.

On the other hand, the ultrasonic wave generated by the second sensor unit 8 (second ultrasonic device 26) enters a fluid passing through the piping P (FIG. 1 and FIG. 3). The ultrasonic wave propagated in the fluid is received by the first sensor unit 6 (first ultrasonic device 24), and the first ultrasonic device 24 outputs an analogue signal based on the received ultrasonic wave. The analogue signal output from the first ultrasonic device 24 is supplied to the reception amplifying part 18 through the transmission/reception switching circuit 20.

The reception amplifying part 18 amplifies the analogue signal received from the transmission/reception switching circuit 20 and converts the amplified analogue signal to a digital signal by an A/D conversion circuit. The digital signal is supplied to the control unit 12.

The control unit 12 executes a program stored in the storage unit 14 to realize functions of a signal computing part 30, a flow rate computing part 32, and a comparison/determination part 34. The signal computing part 30 measures time difference Δt based on the digital signal provided by the reception amplifying part 18. The time difference Δt is a difference between a time t1 required until ultrasonic wave output from the first ultrasonic device 24 is received by the second ultrasonic device 26 and a time t2 required until the ultrasonic wave output from the second ultrasonic device 26 is received by the first ultrasonic device 24. The flow rate computing part 32 computes a velocity of the fluid flowing in the piping P based on a predetermined expression based on the time difference Δt measured by the signal computing part 30 and computes a flow rate of the fluid based on another predetermined expression.

In other words, based on output signals from the first ultrasonic device 24 and the second ultrasonic device 26, the flow rate of the fluid in the piping P is calculated by obtaining the time difference Δt between times required for the ultrasonic wave to propagate from an upstream side to a downstream side and from the downstream side to the upstream side of the fluid flowing in the piping P.

The ultrasonic flow sensor 10 includes an operation unit 36 such as a button operated by a user and a display unit 38 including 7-segment LED and a thin display device, and also includes an output unit 40 such as a connector which constitutes an interface with respect to an external apparatus.

A control output based on a preset threshold value (set value) is output to a display of the display unit 38 or to the external apparatus through the output unit 40. In other words, an ON/OFF signal relating to the detected flow rate of the fluid flowing in the piping P is output based on comparison with respect to a predetermined flow rate threshold value. A pulse is output at every integration flow rate. For example, a digital output of a flow rate measurement value is supplied through communication.

Which of the first and second sensor units 6 and 8 is to be mounted with the components described above is arbitrary. A main substrate 42 (FIG. 3) is mounted on the first sensor unit 6 illustrated in FIG. 1 to FIG. 3, and the control unit 12 and the storage unit 14 are mounted on the main substrate 42. The operation unit 36 which constitutes a user interface, the display unit 38 including the 7-segment LED and the thin display device, and the output unit 40 such as a connector which constitutes the interface with respect to the external apparatus are mounted on the first sensor unit 6 (FIG. 1).

Referring now to FIG. 3, a first sensor portion 44 integrated in the first sensor unit 6 includes the above-described first ultrasonic device 24 and a first wedge member 46. A second sensor portion 48 integrated in the second sensor unit 8 includes the above-described second ultrasonic device 26 and a second wedge member 50. The first sensor portion 44 and the second sensor portion 48 are positioned in a state of being in press contact with a peripheral surface of the piping P as clearly understood from FIG. 3. Preferably, acoustic coupling media, that is, couplants Cp are interposed between the second sensor portion 48 and the piping P, and the first sensor portion 44 and the piping P. The couplant Cp is preferably a solid body (for example, an elastic couplant, that is, a rubber sheet), but may be a fluid body such as grease.

The couplant Cp will be described in further detail. The couplant Cp preferably has an acoustic impedance value between an acoustic impedance value of the wedge members 46 and 50 and an acoustic impedance value of the piping P. Accordingly, reflection of ultrasonic waves between the couplant Cp and the piping P and between the couplant Cp and the wedge members 46 and 50 may be reduced. Consequently, an improvement of transmission efficiency and receiving efficiency of ultrasonic waves by the ultrasonic device is achieved.

For example, the acoustic impedance of a representative medium is as follows. Air: 428 kg/m$^2$s, iron: 46.4×10$^6$ kg/m$^2$s, polyethylene: 1.75×10$^6$ kg/m$^2$s.

Figure 5:
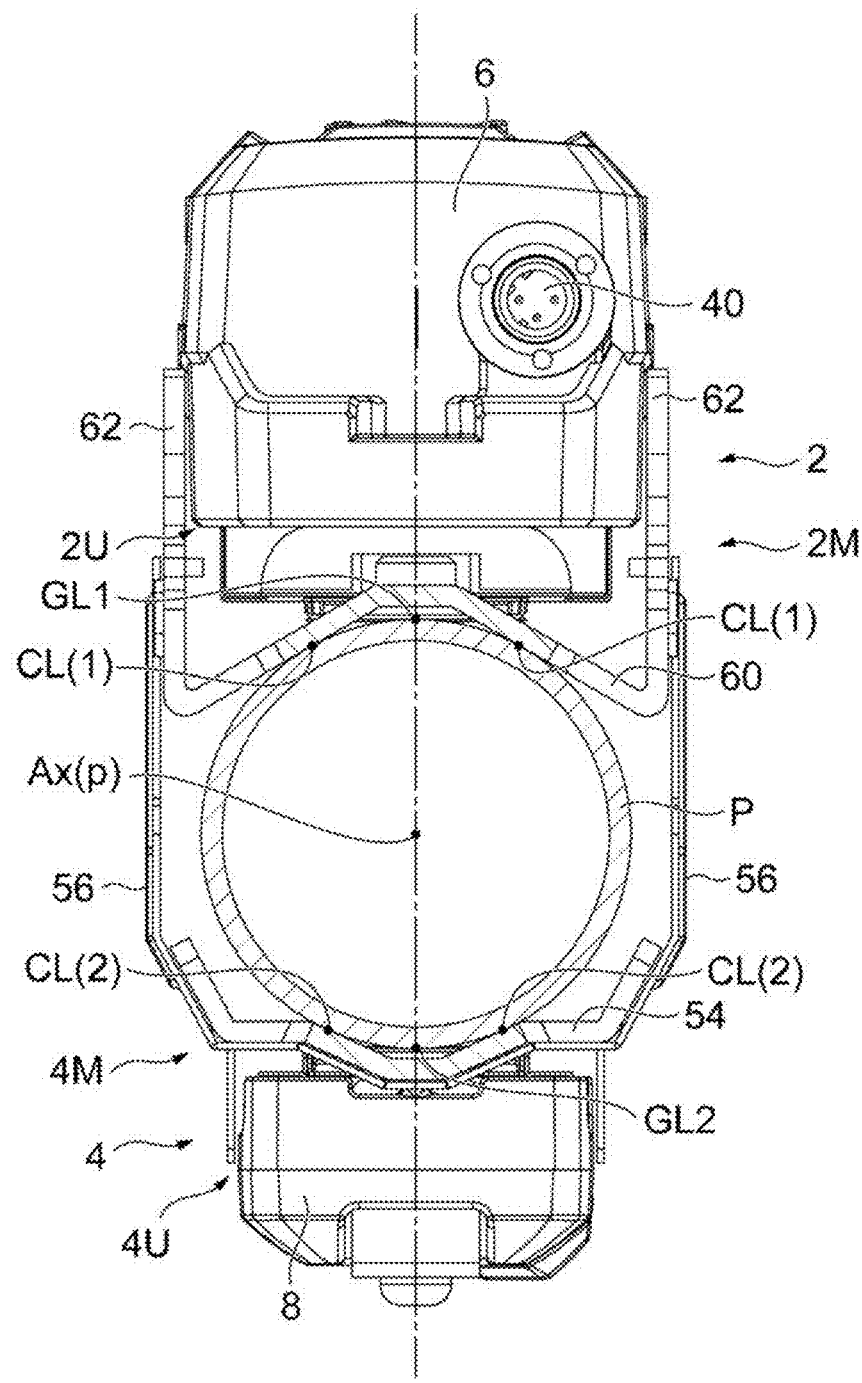
FIG. 5 is a cross-sectional view of the ultrasonic flow sensor system of the first embodiment.
Figure 6:
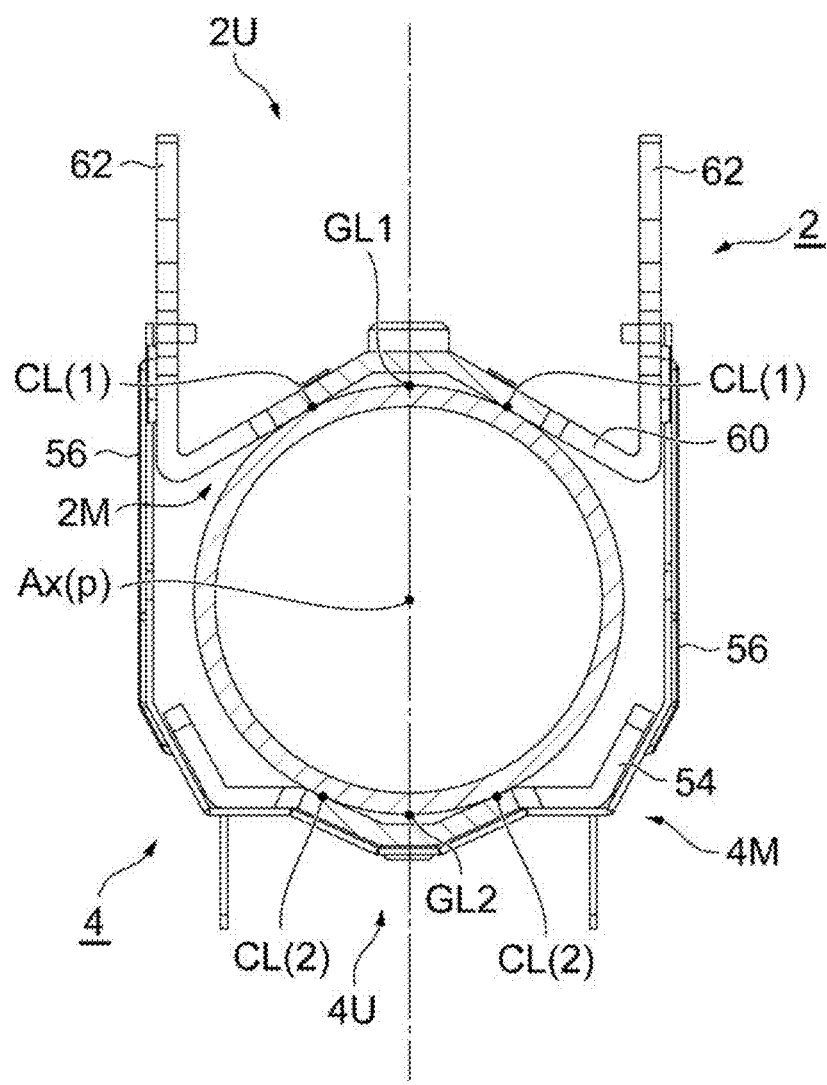
FIG. 6 is a cross-sectional view of the ultrasonic flow sensor system illustrated in FIG. 5 with first and second sensor units are omitted.
Figure 7:
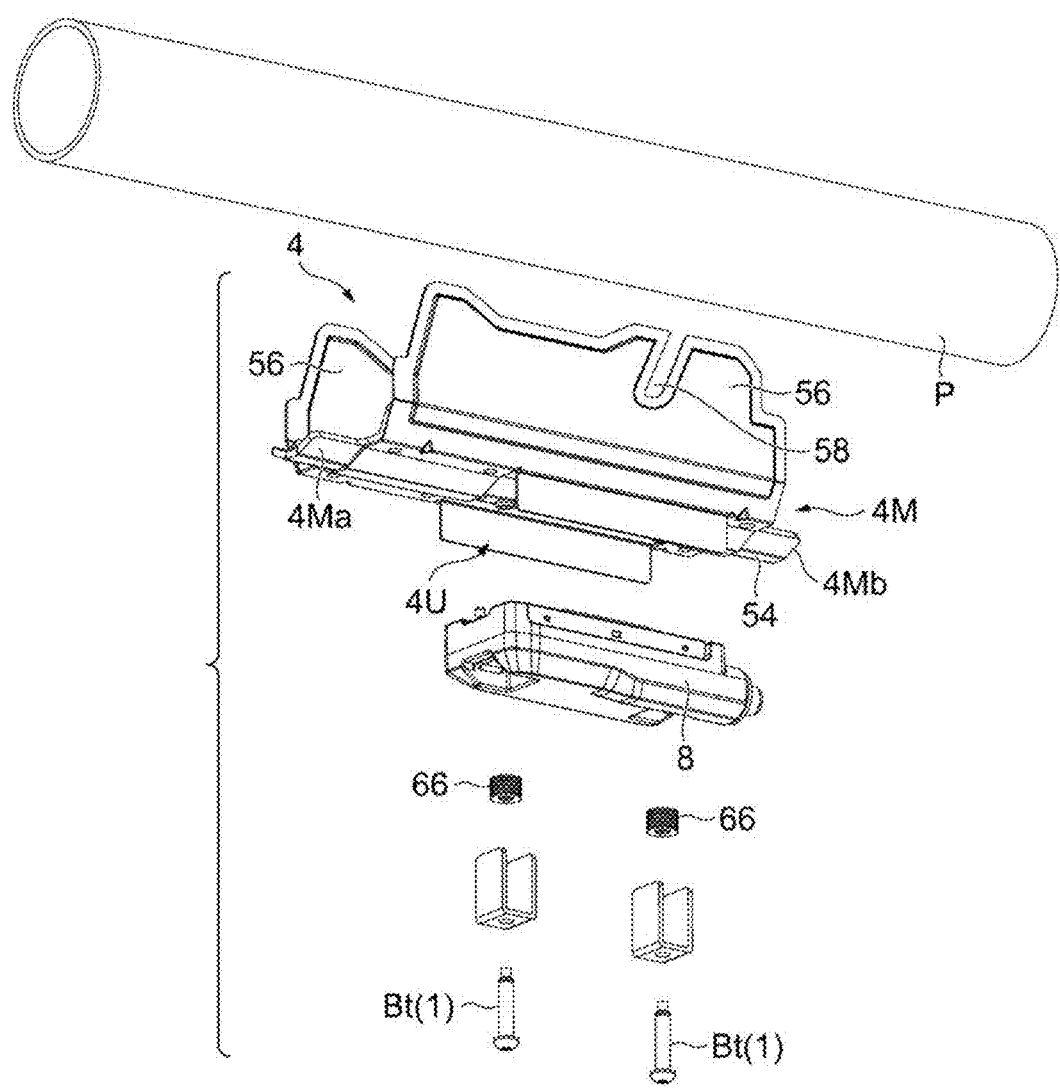
FIG. 7 is an exploded perspective view of a second fitting and the second sensor unit included in the ultrasonic flow sensor system of the first embodiment.

FIG. 5 is a cross-sectional view illustrating a state in which the first and second sensor units 6 and 8 are fixed to the piping P with the first and second fittings 2 and 4. FIG. 6 is a drawing from which the first and second sensor units 6 and 8 are omitted from FIG. 5. FIG. 7 is an exploded perspective view of the second fitting 4 and the second sensor unit 8.

Referring now to FIG. 5 to FIG. 7, the second fitting 4 includes a second fitting portion 4M to be fitted to the piping P and a second unit housing portion 4U configured to receive the second sensor unit 8. The second fitting portion 4M has a length extending along the direction of a longitudinal axis Ax(p) of the piping P and one end portion 4Ma and the other end portion 4Mb of the second fitting portion 4M are fixed to the piping P by using first and second bands Bd(1) and Bd(2) as the most clearly understood from FIG. 2. The first and second bands Bd(1) and Bd(2) are wound around the piping P in the circumferential direction in a state of respectively binding the one end portion 4Ma and the other end portion 4Mb. Each of the bands Bd(1) and Bd(2) is placed around the piping P by a fixing member 52 (FIG. 2) in a ring shape, and each of the bands Bd(1) and Bd(2) may be tensed up and be maintained in the tensed-up state by tightening a screw 52a (FIG. 2) of the fixing member 52.

The second fitting portion 4M of the second fitting 4 includes a second position regulating portion 54. A cross-sectional shape of the second position regulating portion 54 will be described later. The second fitting 4 includes a pair of second arm portions 56 extending from both side edge of the second position regulating portion 54 so as to facing each other.

Figure 2:
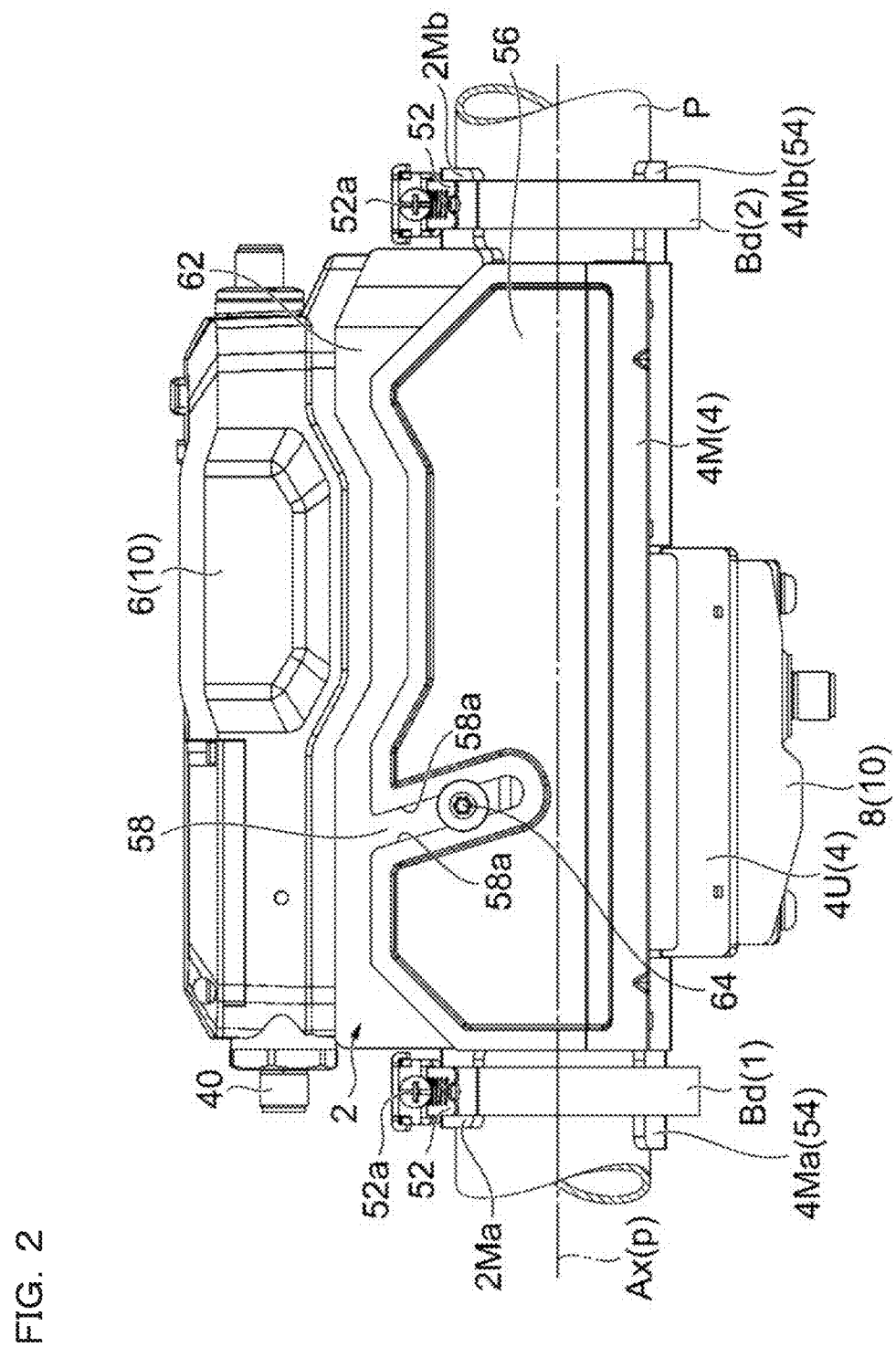
FIG. 2 is a side view of the ultrasonic flow sensor system of the first embodiment.

Referring to FIG. 2 and FIG. 7, as a typical example, the one end portion 4Ma and the other end portion 4Mb of the second fitting portion 4M are positioned apart from each other in the longitudinal direction and constitute the second position regulating portion 54. The second position regulating portion 54 typically includes a shape coming into contact with the piping P at two positions CL(2) and CL(2) on circular cross section thereof (FIG. 5 and FIG. 6). The contact positions CL(2) extend parallel to the direction of the longitudinal axis Ax(p) of the piping P.

When the second fitting 4 is attached to the piping P, the second fitting 4 comes into contact with the piping P at least at two positions CL(2) with the second sensor unit 8, that is, the second mother line GL2 interposed therebetween when viewing the piping P in cross section. Accordingly, the second sensor unit 8 is aligned with the second mother line GL2 (FIG. 3), and simultaneously, the second sensor unit 8 is oriented to the diameter direction passing the center of the piping P. In other words, the direction of the longitudinal axis of the second fitting 4 is aligned with the second mother line GL2 of the piping P by fixing the second fitting 4 to the piping P with the second position regulating portion 54.

The second position regulating portion 54 preferably has a symmetrical shape in a cross-section along a direction crossing across the piping P with respect to the second mother line GL2 (FIG. 3) as clearly understood from FIG. 5 and FIG. 6, and preferably, has a shape which comes into contact with the piping at positions at the same distance apart from the second mother line GL2. Typically, the second position regulating portion 54 preferably has a shape having a pair of molded inclined wing portions extending toward one side and the other side with respect to the second mother line GL2 at a predetermined angle.

The second arm portions 56 of the second fitting portion 4M have a shape extending from both sides of the second position regulating portion 54 along the both sides of the piping P. Each of the second arm portions 56 includes an inclined slit 58 (FIG. 2 and FIG. 7), and the slit 58 is defined by a pair of inclined edges 58a and 58a extending in parallel to each other.

Figure 8:
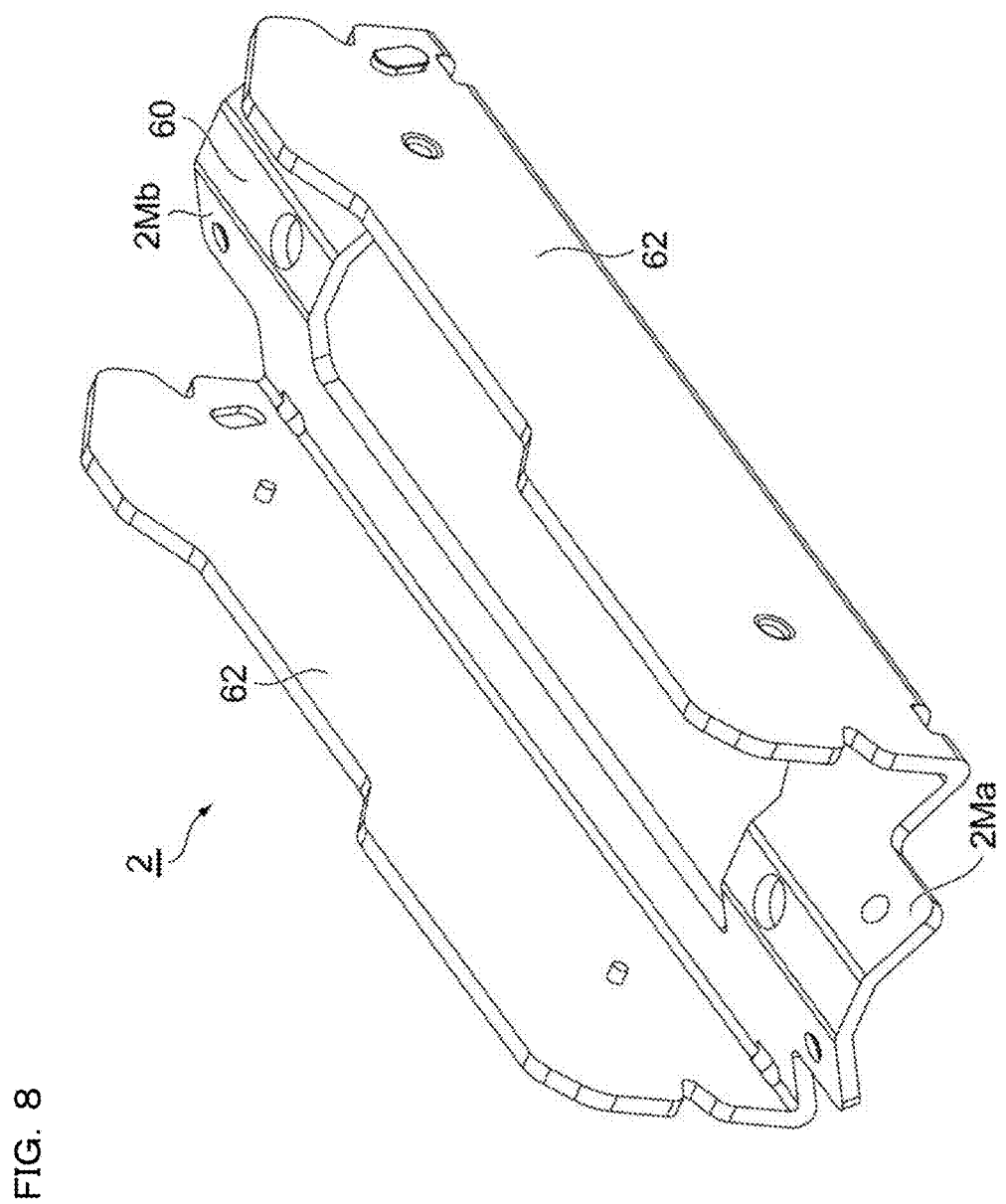
FIG. 8 is a perspective view of a first fitting included in the ultrasonic flow sensor system of the first embodiment.
Figure 9:
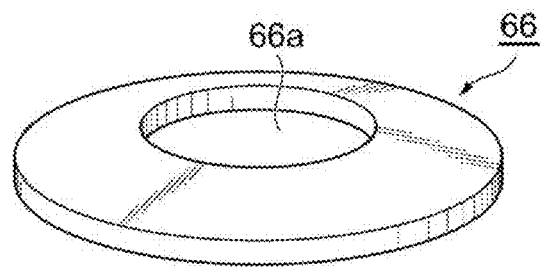
FIG. 9 is an explanatory drawing illustrating a disc spring integrated in the second fitting of the ultrasonic flow sensor system of the first embodiment.

Referring to FIG. 8, the first fitting 2 will be described. The first fitting 2 includes a first fitting portion 2M to be fitted to the piping P, and a first unit housing portion 2U for receiving the first sensor unit 6. The first fitting portion 2M has a length extending along the direction of the longitudinal axis Ax(p) of the piping P, and one end portion 2Ma and the other end portion 2Mb of the first fitting portion 2M are fixed to the piping P by using the aforesaid first and second bands Bd(1) and Bd(2) as the most clearly understood from FIG. 2. In other words, the first and second bands Bd(1) and Bd(2) are used for fixing the first fitting 2 and the second fitting 4 together to the piping P. However, the first fitting 2 and the second fitting 4 may be fixed to the piping P by using different bands from each other.

The first fitting portion 2M of the first fitting 2 includes a first position regulating portion 60 (FIG. 8). Referring to FIG. 5 and FIG. 6, the first position regulating portion 60 typically has a shape coming into contact with the piping P at two positions CL(1) on the circular cross section thereof. In other words, when the first fitting 2 is attached to the piping P, the first fitting 2 comes into contact with the piping P at least at two positions CL (1) with the first sensor unit 6 interposed therebetween when viewing a cross-section of the piping P. Accordingly, the first sensor unit 6 is aligned with the first mother line GL1, and simultaneously, the first sensor unit 6 is oriented to the diameter direction passing the center of the piping P. In other words, the direction of the longitudinal axis of the first fitting 2 is aligned with the first mother line GL1 of the piping P by fixing the first fitting 2 to the piping P with the first position regulating portion 60.

Referring to FIG. 5, FIG. 6, and FIG. 8, the first fitting 2 includes a pair of first arm portions 62 extending from both side edge of the first position regulating portion 60 so as to facing each other. The first arm portions 62 have a wing shape formed by molding in the same manner as the second arm portions 56 of the second fitting 4 described above. The first arm portions 62 extend in a direction apart from the piping P in the diameter direction, and the first sensor unit 6 is accommodated in a space interposed between the pair of first arm portions 62. The first arm portions 62 overlap with the second arm portions 56 partly in an adjacent state. The first arm portions 62 are fixedly provided with pins 64, and the second arm portions 56 are provided with the inclined slits 58 at overlapped portions between the first and second arm portions 62 and 56. The inclined slit 58 extends so as to incline from a diameter direction Dm of the piping P to the longitudinal direction of the piping P. The width of the inclined slit 58 is uniform from an entry to a bottom of the slit 58 in the longitudinal direction.

In the Z-shaped arrangement, the first sensor unit 6 and the second sensor unit 8 are disposed respectively on the first mother line GL1 and the second mother line GL2 opposing each other in the diameter direction passing through the center of the piping P (FIG. 3 and FIG. 5).

Referring to FIG. 1 and FIG. 2, preferably the pair of inclined slits 58 of the molded second arm portions 56 of the second fitting 4 are symmetrically positioned with the intermediary of a plane including the first and second mother lines GL1 and GL2, and a pair of the pins 64 of the first fitting 2 are symmetrically positioned. The pins 64 are received respectively in the inclined slits 58 corresponding thereto. Preferably, the diameter of the pins 64 is substantially the same as the width of the inclined slits 58, and the pins 64 are movable in the inclined slits 58 by being guided by the inclined slits 58.

When the first and second sensor units 6 and 8 are attached to the piping P having a given diameter by using the first fitting 2 and the second fitting 4, the pins 64 of the first fitting 2 and the inclined slits 58 of the second fitting 4 constitute elements for realizing the information conversion mechanism. In other words, information on the diameter of the piping P is detected by the first and second fittings 2 and 4 positioned apart from each other in the diameter direction of the piping P, and the information on the diameter of the piping P is converted into information on an adequate distance between the first and second fittings 2 and 4 along the direction of the longitudinal axis Ax(p) of the piping P by the pins 64 movable in the inclined slits 58, so that the relative position of the first and second fittings 2 and 4 in the direction of the longitudinal axis Ax(p) of the piping P is determined, and the first and second fittings 2 and 4 are slid along the direction of the longitudinal axis Ax(p) of the piping P to position the first and second fittings 2 and 4. The information conversion mechanism is one of specific functions of the guide portions that guide the relative positioning between the first and second fittings 2 and 4 in the direction of the longitudinal axis Ax(p) of the piping P, and the configuration of the information conversion mechanism is one of specific configurations of the guide portions.

When applying the first and second fittings 2 and 4 to the piping P having a given diameter, the pair of first arm portions 62 of the first fitting 2 are preferably adjacent to and parallel to the pair of second arm portions 56 of the second fitting 4 corresponding thereto to realize the above information conversion mechanism smoothly. Further preferably, the pair of first arm portions 62 of the first fitting 2 are parallel to each other, and the pair of second arm portions 56 of the second fitting 4 are parallel to each other.

Referring to FIG. 2, as a typical example, at least two positions, namely, the one end portion 4Ma and the other end portion 4Mb of the second fitting portion 4M are positioned apart from each other in the longitudinal direction and constitute the second position regulating portion 54. However, the second position regulating portion 54 may be configured to be continuously positioned in the longitudinal direction of the second fitting portion 4M. Referring now to FIG. 6, the second position regulating portion 54 typically has a shape molded so as to come into contact with the piping P at the two positions CL(2) and CL(2) in the circular cross section of the piping P. In other words, when the second fitting 4 is attached to the piping P, the second fitting 4 comes into contact with the piping P at least at the two positions CL(2) in symmetry with respect to the second mother line GL2 (FIG. 3 and FIG. 5) when viewing the piping P in cross section. Accordingly, the second sensor unit 8 is aligned with the second mother line GL2, and simultaneously, the second sensor unit 8 is oriented to the diameter direction passing the center of the piping P. In other words, the direction of the longitudinal axis of the second fitting 4 is aligned with the second mother line GL2 of the piping P by fixing the second fitting 4 to the piping P with the second position regulating portion 54.

As described above, the second position regulating portion 54 of the second fitting 4 preferably has asymmetrical shape in a cross-section along a direction crossing across the piping P with respect to the second mother line GL2, and preferably, has a shape molded to come into contact with the piping P at the positions CL(2) at the same distance apart from the second mother line GL2. Typically, the second position regulating portion 54 preferably has a shape having a pair of molded inclined wing portions extending toward one side and the other side with respect to the second mother line GL2 at a predetermined angle. This is the same for the first position regulating portion 60 of the first fitting 2.

When fixing the first fitting 2 and the second fitting 4 to the piping P, the following positioning is performed automatically.

(1) Paired combination between the inclined slits 58 and the pins 64 have functions for converting the first information to the second information as described above. The first information is information on the diameter of the piping P. The second information is information on a predetermined adequate distance between the first and second fittings 2 and 4 along the direction of the longitudinal axis of the piping P. Relative position between the first fitting 2 and the second fitting 4 facing each other with the piping P interposed therebetween is the information on the diameter of the piping P. The first information is converted into the second information by the pins 64 guided by the inclined slits 58 in the direction of the longitudinal axis Ax(p) of the piping P, and the second fitting 4 is positioned by an angle of inclination of the inclined slits 58, that is, by an angle from the diameter direction of the piping P at an adequate distance along the direction of the longitudinal axis Ax(p) of the piping P from the first fitting 2.

(2) The inclined slits 58 and the pins 64 are disposed respectively on the pair of first arm portions 62 and the pair of second arm portions 56 of the first and second fittings 2 and 4, which are molds, and the corresponding first and second arm portions 62 and 56 are positioned adjacently to each other. Therefore, even when the first and second fittings 2 and 4 are applied to piping P having different diameters, the aforesaid positioning in the diameter direction of the first and second sensor units 6 and 8 are maintained.

(3) The inclined slits 58 and the pins 64 are disposed respectively on the pair of first arm portions 62 and the pair of second arm portions 56 of the first and second fittings 2 and 4, which are molds, and the corresponding first and second arm portions 62 and 56 are positioned adjacently to each other. Therefore, even when the first and second fittings 2 and 4 are applied to piping P having different diameters, the positioning of the first and second sensor units 6 and 8 on the aforesaid first and second mother lines GL1 and GL2 (FIG. 3) are maintained.

Referring to FIG. 2 and FIG. 3, in the direction of the longitudinal axis Ax(p) of the piping P, one end portion and the other end portion of the first and second fittings 2 and 4 are tightened together by the first and second bands Bd(1) and Bd(2). The first fitting 2 and the second fitting 4 may be fixed to the piping P by using separate bands.

Referring continuously to FIG. 3, the first sensor unit 6 is fastened to the first fitting 2 by using first bolts Bt(1). The direction of tightening of the first bolts Bt(1) is a direction of press contact of the first sensor unit 6 with respect to the piping P, that is, the diameter direction of the piping P. Therefore, by tightening the first bolts Bt(1), the first sensor unit 6 is brought into press contact with the piping P.

The second sensor unit 8 is fastened to the second fitting 4 by using second bolts Bt(2). The direction of fastening of the second bolts Bt(2) is a direction of press contact of the second sensor unit 8 with respect to the piping P, that is, the diameter direction of the piping. Therefore, by tightening the second bolts Bt(2), the second sensor unit 8 is brought into press contact with the piping P.

As preferable mode, at least the second fitting 4 is provided with biasing members 66 that bias the second sensor unit 8 in the direction of coming into press contact with the piping P. In the first embodiment, the biasing members 66 include a plurality of disc springs (FIG. 9) arranged coaxially with the second bolts Bt(2). The disc spring 66 has a conical shape provided with a center hole 66a, and configured to generate a spring force by being applied with a load in the direction of reducing the height of the disc springs 66. In the first embodiment, a plurality of the disc springs 66 are disposed coaxially with each of the second bolts Bt(2). The first fitting 2 may also be provided with biasing members (disc springs) 66 configured to bias the first sensor unit 6 the direction of coming into press contact with the piping P.

Figure 10:
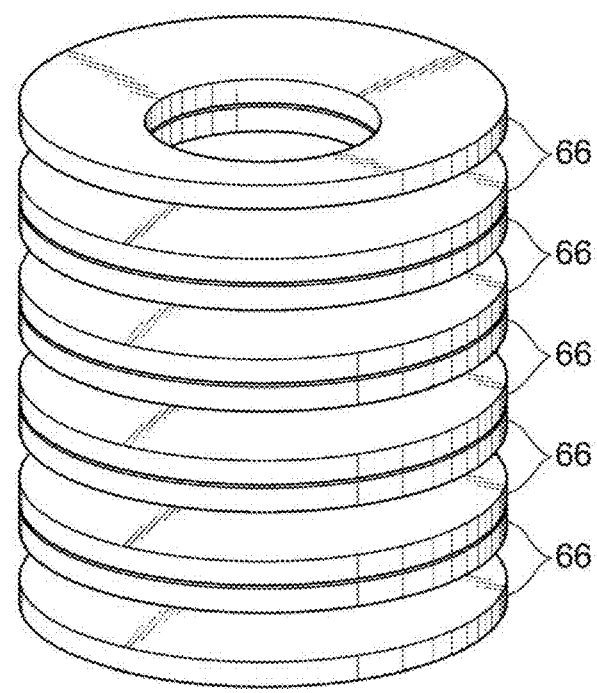
FIG. 10 is an explanatory drawing illustrating an example of an array of a plurality of the disc springs in a case where the plurality of disc springs illustrated in FIG. 9 are integrated in the second fitting.
Figure 11:
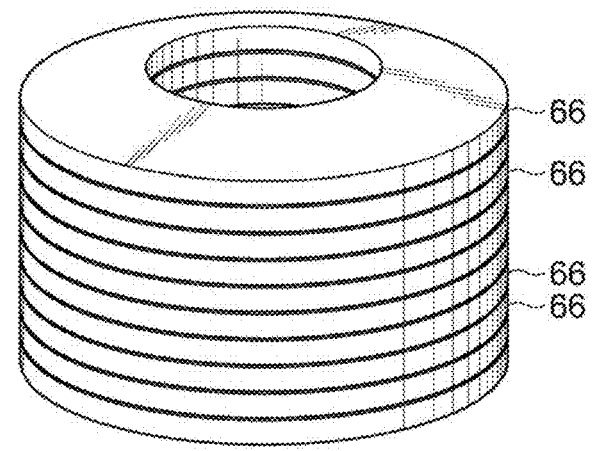
FIG. 11 is an explanatory drawing illustrating an example of another array of a plurality of disc springs in a case where the plurality of disc springs illustrated in FIG. 9 are integrated in the second fitting.

The plurality of disc springs 66 may be arranged in a first disc spring array in which every one or more disc springs are inverted upside down as illustrated in FIG. 10 or may be arranged in a second disc spring array in which all the plurality of disc springs are arranged in the same orientation without being inverted upside down as illustrated in FIG. 11.

By adding the biasing members 66 to the second fitting 4, the second fitting 4 and the first fitting 2 having the Z-shaped arrangement may be attached to the piping P in a state of facing one side of the piping P.

Specific steps will be described below.

(Step 1) Assemble the second sensor unit 8 to the second fitting 4 (FIG. 5).

(Step 2) Assemble the first sensor unit 6 to the first fitting 2 in the same manner as in Step 1.

(Step 3) Provisionally fix the second fitting 4 having the second sensor unit 8 mounted thereon to the piping P, and provisionally fix the first fitting 2 having the first sensor unit 6 mounted thereon to the piping P in a state in which an operator faces the piping P. This provisional fixation may be performed by using the bands Bd(1) and Bd(2). In the state of being provisionally fixed, the second sensor unit 8 is in the state of being biased toward the peripheral surface of the piping P by the disc springs 66 of the second fitting 4. The second fitting 4 is positioned on the opposite side of the piping P when viewed from the operator.

(Step 4) Confirm that two pins 64 of the first fitting 2 are correctly positioned in two inclined slits 58 of the second fitting 4, then tighten the bands Bd(1) and Bd(2) firmly to fix the first and second fittings 2 and 4 to the piping P.

Accordingly, by the cooperation of the inclined slits 58 of the first fitting 2 and the pins 64 of the second fitting 4, the first sensor unit 6 is positioned on the first mother line GL1, and the second sensor unit 8 is positioned on the second mother line GL2. The first and second sensor units 6 and 8 are located apart from each other along the direction of the longitudinal axis Ax(p) of the piping P, and the distance is properly adjusted. The second sensor unit 8 is brought into a press contact state with respect to the peripheral surface of the piping P by the disc springs 66 of the second fitting 4.

Assembly of the first sensor unit 6 to the first fitting 2 in Step 2 may be performed after the step for fixing the first and second fittings 2 and 4 to the piping P in Step S4 described above. Fixing the first sensor unit 6 to the first fitting 2 by using the bolt Bt(1), a state in which the first sensor unit 6 is brought into a press contact with the piping P by the fixation of the bolt Bt(1) is achieved.

Second Embodiment (FIG. 12 to FIG. 22)

Figure 12:
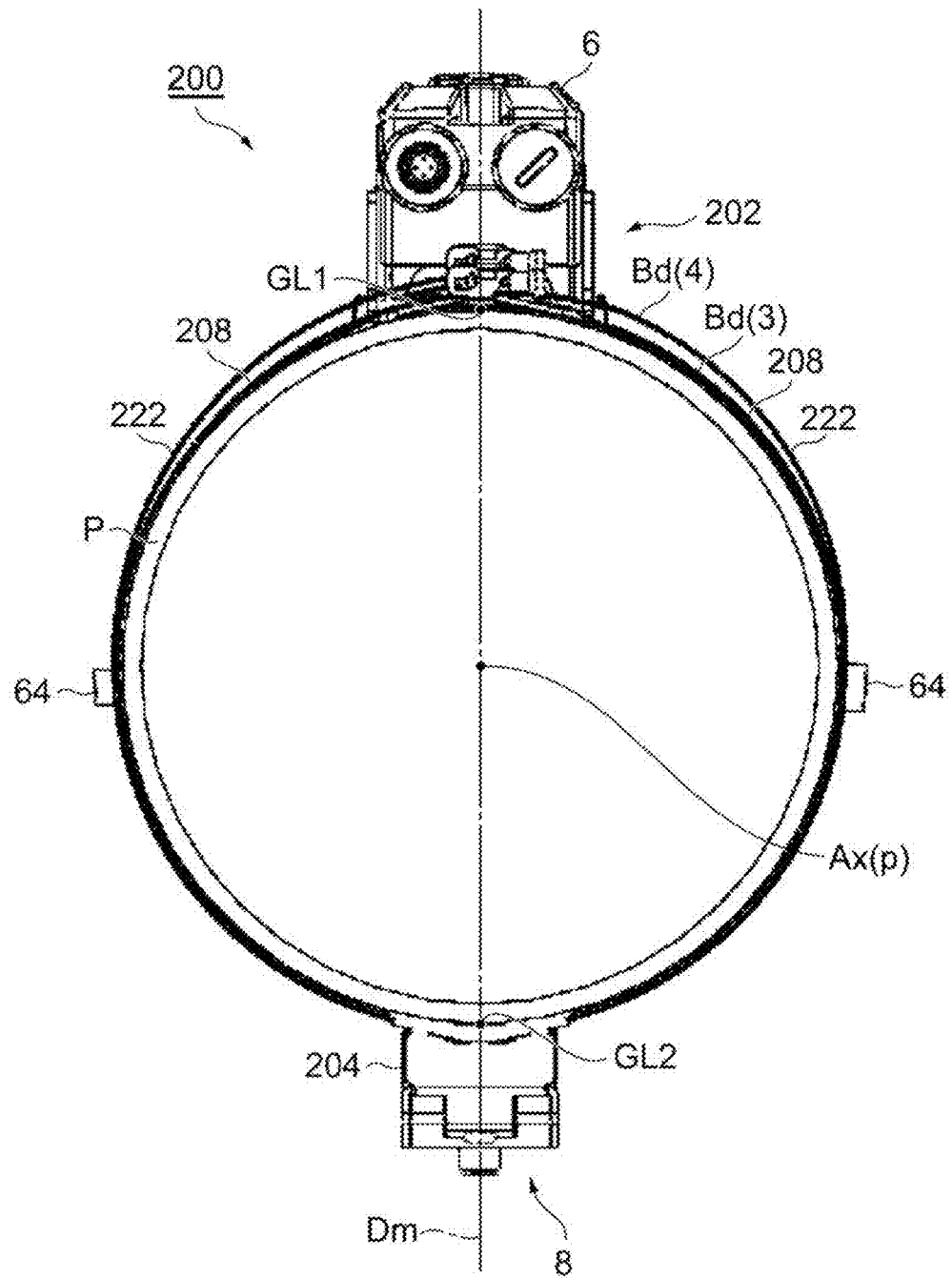
FIG. 12 is an end view of an ultrasonic flow sensor system of a second embodiment assembled on piping.
Figure 13:
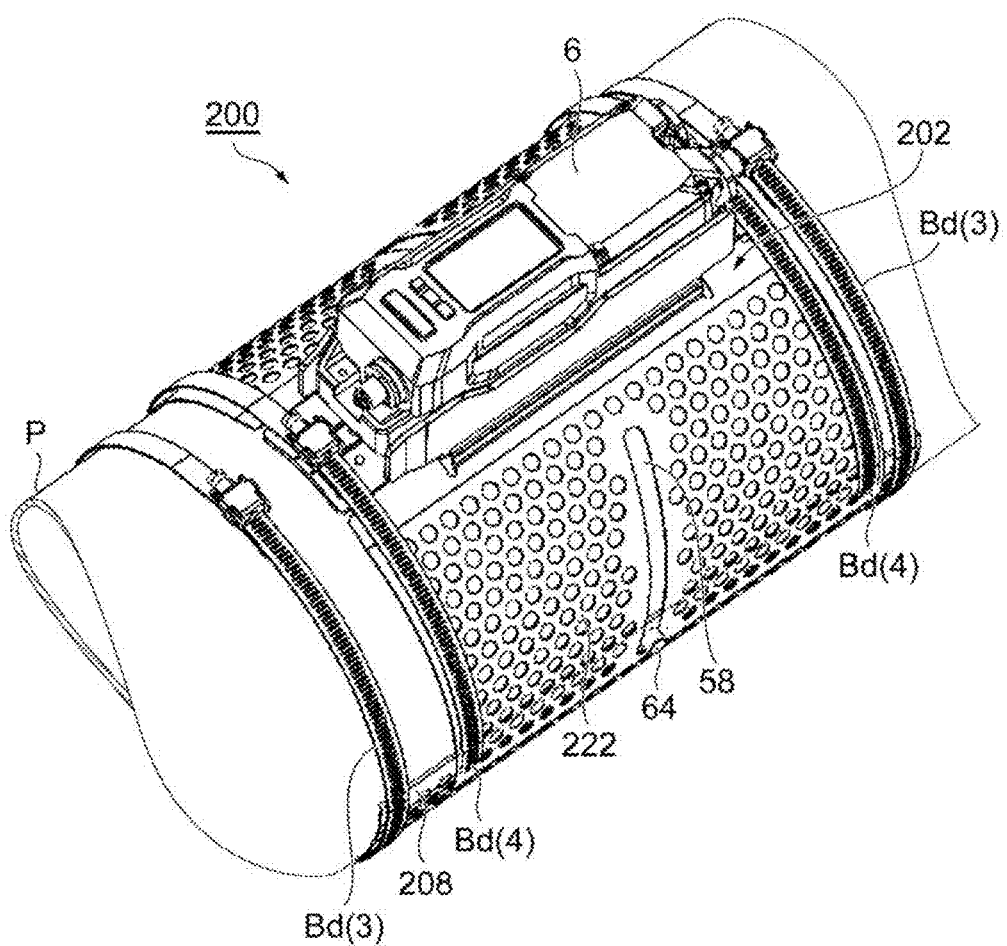
FIG. 13 is a perspective view of the ultrasonic flow sensor system of the second embodiment assembled on the piping.
Figure 14:
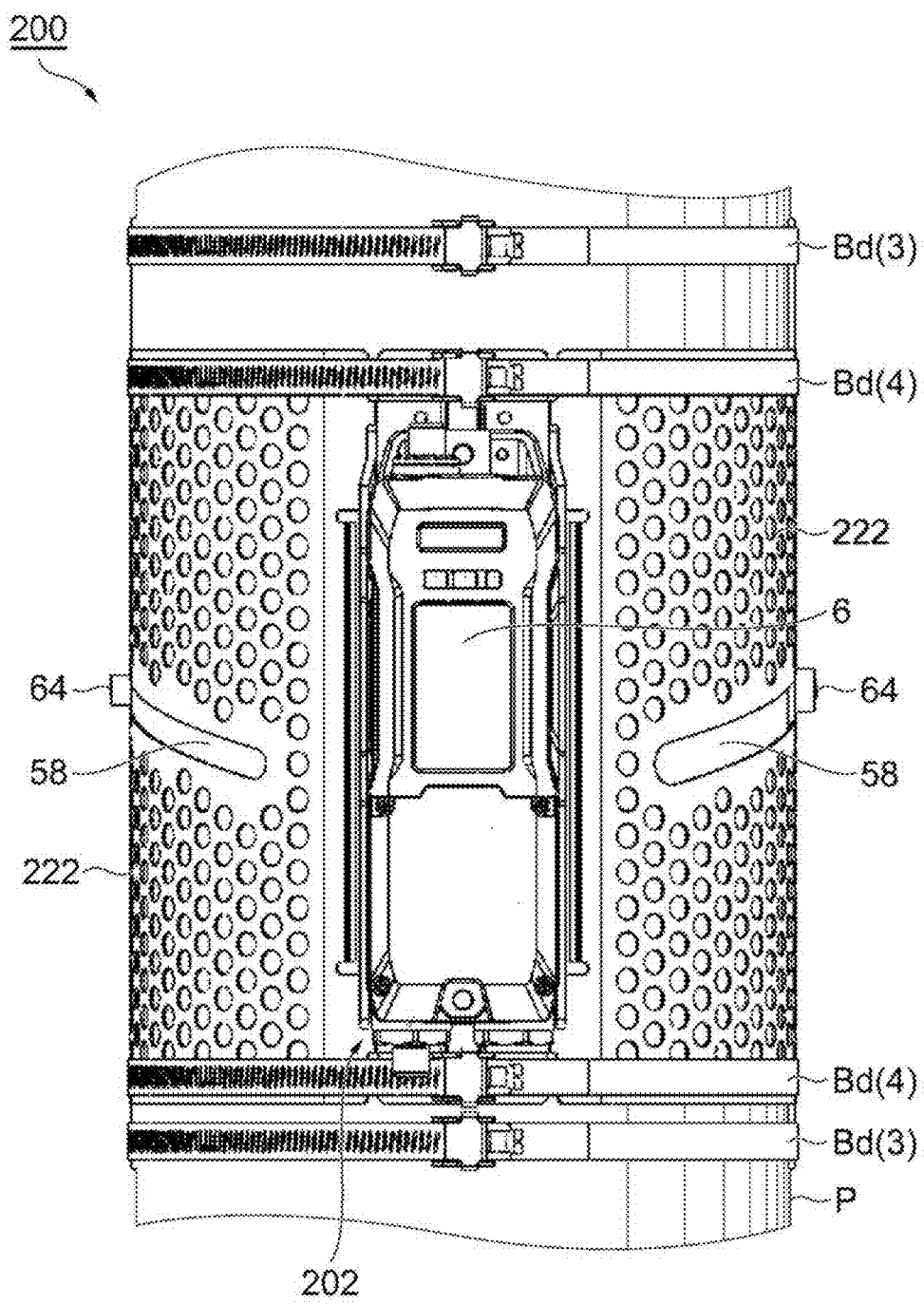
FIG. 14 is a front view of the ultrasonic flow sensor system of the second embodiment assembled on the piping in a direction viewing right from the front.
Figure 15:
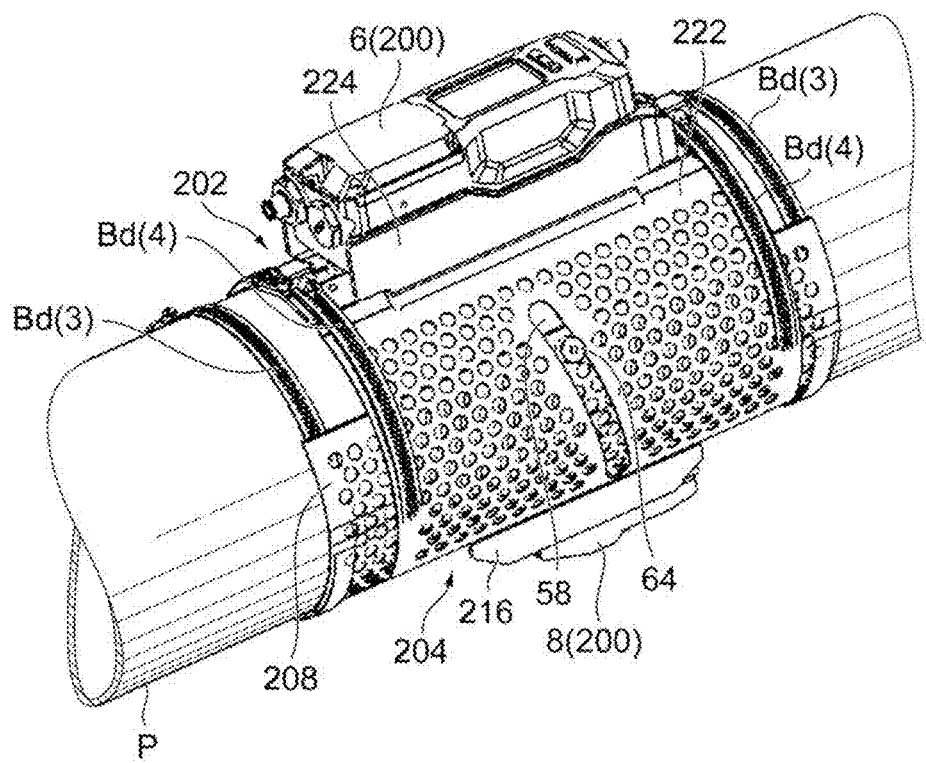
FIG. 15 is a perspective view of the ultrasonic flow sensor system of the second embodiment assembled on the piping.
Figure 16:
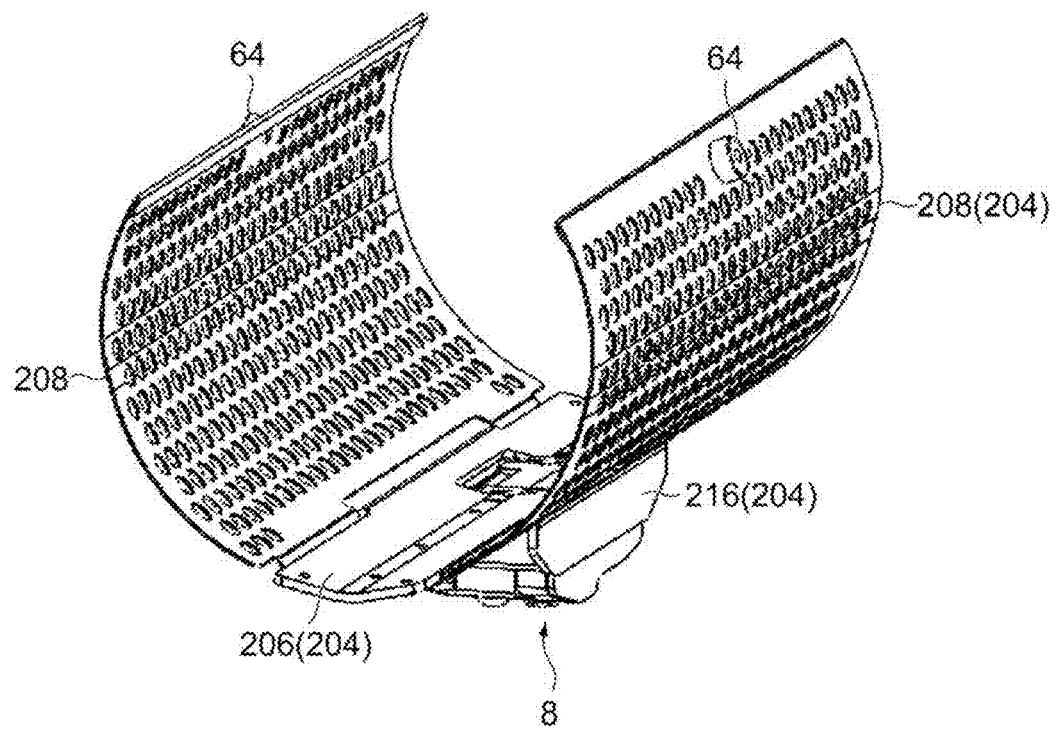
FIG. 16 is a perspective view of a second fitting included in the ultrasonic flow sensor system of the second embodiment.

The first and second sensor units included in an ultrasonic flow sensor system 200 of a second embodiment illustrated in FIG. 12 and the like are the same as the first and second sensor units 6 and 8 (FIG. 1 to FIG. 3) included in the above-described first embodiment. Therefore, detailed description will be omitted in the description of the second embodiment by designating the first sensor unit by reference numeral 6 and designating the second sensor unit by reference numeral 8.

The ultrasonic flow sensor system 200 of the second embodiment includes first and second fittings 202 and 204, and the first and second sensor units 6 and 8 may be attached to the peripheral surface of the piping P by using the two fittings 202 and 204. The ultrasonic flow sensor system 200 of the second embodiment is an attachment system suitable for the Z-shaped arrangement.

The piping P or the fluid flowing in the piping P are not specifically limited for the application of the second embodiment. However, a typical example of application will be listed below.
(1) Diameter of Piping P: 100 mm to 220 mm (Suitable diameter of Piping P: approximately 114 mm to approximately 216 mm)
(2) Material of Piping P: steel, SUS, copper, polyvinyl Chloride (PVC)
(3) Fluid: water, oil, drug solution, antifreeze (ethylene glycol), coolant In the clamp-on ultrasonic flow sensor, by using the fittings of the ultrasonic flow sensor which is capable of positioning the first and second sensor units automatically at adequate positions only by an operation to fix the fittings to piping having a given diameter, the user is allowed to proceed an operation to attach the first and second sensor units to the piping in the Z-shaped arrangement in a state of facing the piping.

Figure 17:
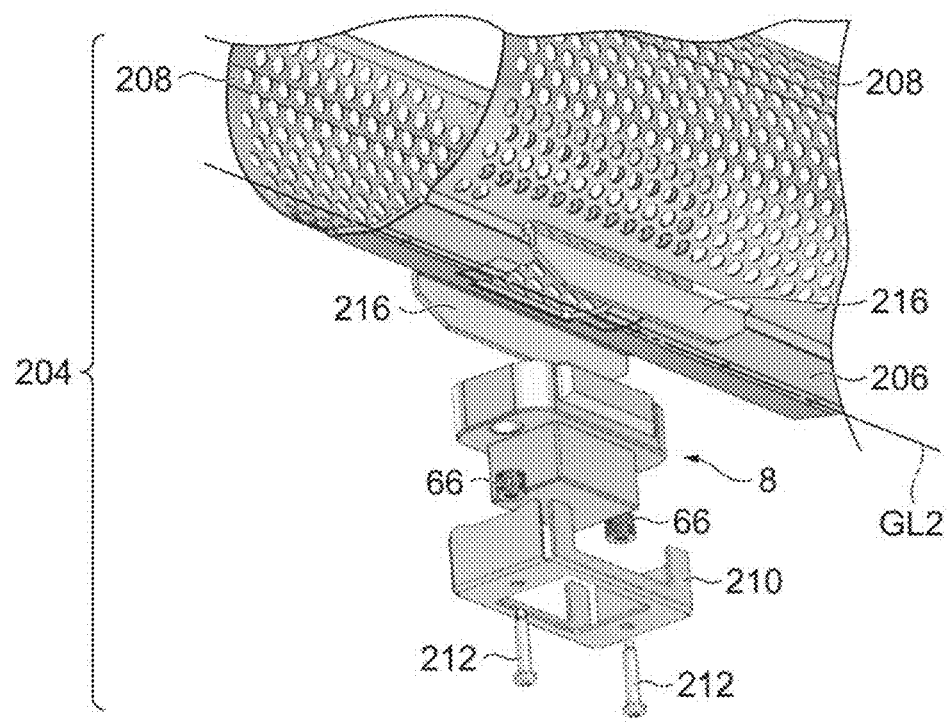
FIG. 17 is an exploded perspective view of the second fitting included in the ultrasonic flow sensor system of the second embodiment.

Referring now to FIG. 16 to FIG. 21, a fitting in which the second sensor unit 8 is installed, that is, the second fitting 204 will be described. Referring now to FIG. 17, the second fitting portion of the second fitting 204 includes a press-molded elongated second position regulating portion 206 and second arm portions 208 coupled to one side edge and the other side edge of the second position regulating portion 206. The second position regulating portion 206 and the second arm portions 208 have a length along the direction of the longitudinal axis Ax(p) of the piping P.

The second arm portions 208 are bendable in the circumferential direction along the cross-sectional circle of the piping P. Specifically, the second arm portions 208 are formed of a bendable plate member, preferably a punched metal. With the second arm portions 208 formed of the punched metal, reduction in weight of the second arm portions 208 is achieved while securing a predetermined rigidity of the second arm portions 208.

Figure 18:
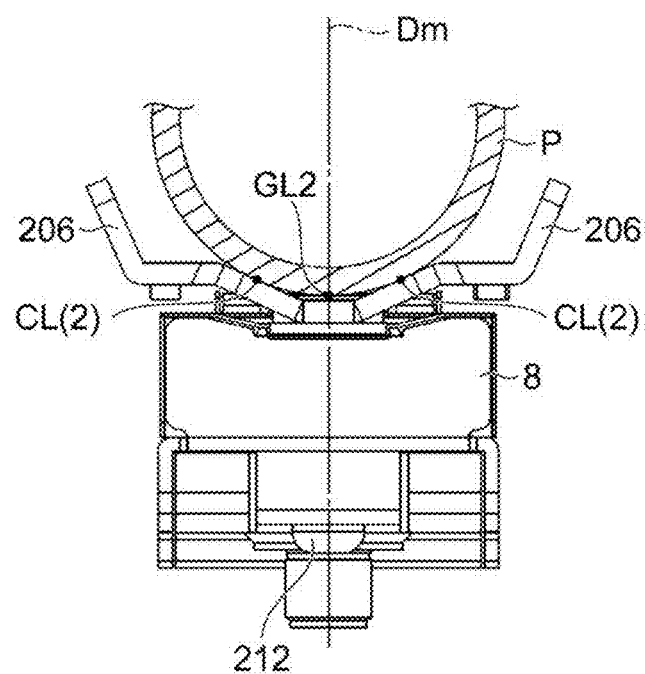
FIG. 18 is an end view of the second fitting included in the ultrasonic flow sensor system of the second embodiment.
Figure 19:
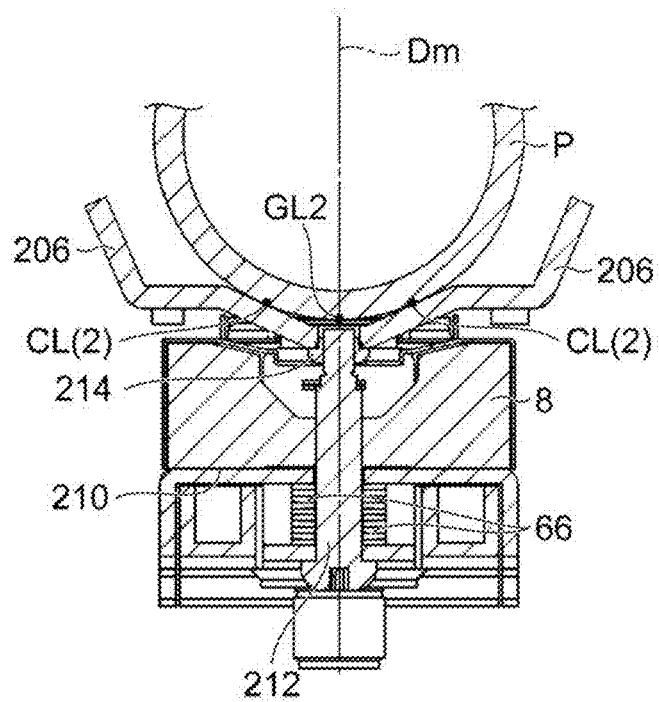
FIG. 19 is a cross-sectional view of the second fitting included in the ultrasonic flow sensor system of the second embodiment.
Figure 21:
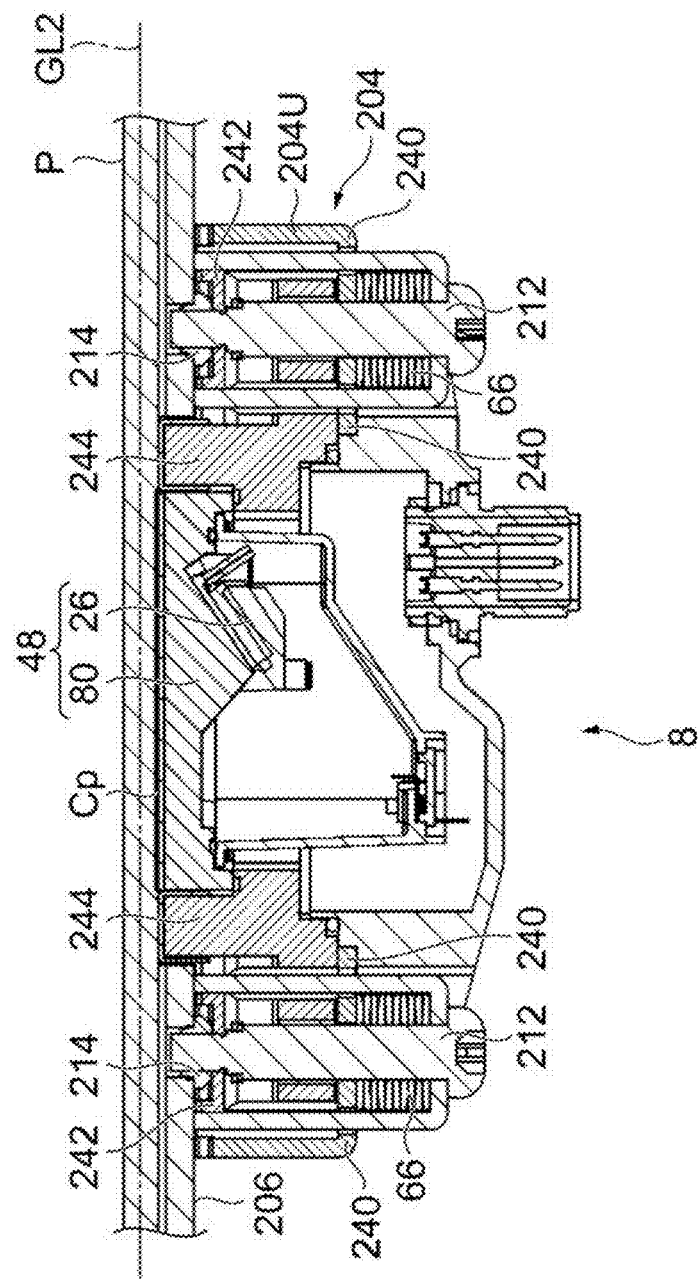
FIG. 21 is an explanatory cross-sectional view illustrating a state in which a second sensor unit included in the ultrasonic flow sensor system of the second embodiment is attached to the piping with the second fitting.

FIG. 18 is an end view of the second position regulating portion 206, and FIG. 19 is a cross-sectional view of the second position regulating portion 206. Referring now to FIG. 16 to FIG. 19, the second position regulating portion 206 includes nuts 214 (FIG. 19) in which bolts 212 passing through a unit housing member 210 (FIG. 17 and FIG. 19) enclosing the second sensor unit 8 are screwed. Two of the bolts 212 are arranged at a distance on the diameter Dm of the piping P, that is, on the second mother line GL2. The unit housing member 210 constitutes a second unit housing portion in cooperation with the second position regulating portion 206 and a pair of vertical walls 216 (FIG. 17) erecting from the second position regulating portion 206. Referring to FIG. 21, the aforesaid plurality of disc springs 66 are coaxially put on the bolts 212, and the second sensor unit 8 is biased by the disc springs 66 in the direction coming into press contact with the piping P.

Referring to FIG. 21, in the second fitting 204, a biasing force of the plurality of disc springs 66 arranged coaxially with two bolts 212 located with the second sensor unit 8 interposed therebetween presses flanges 240. The flanges 240 are engaged by the second sensor unit 8. Therefore, the second sensor unit 8 is biased by the disc springs 66 in the direction of coming into press contact with the piping P, and the second sensor unit 8 is movable in the direction of coming into press contact with the piping P. A member which guides the displacement of the second sensor unit 8 in the radial direction of the piping P is indicated by reference numeral 244 in FIG. 21.

As will be understood with reference to FIG. 21, two displacement guiding members 244 are provided apart from each other with the intermediary of the second sensor unit 8 in the axial direction of the piping P. The displacement guiding members 244 are biased toward the piping P by the disc springs 66, and transfer this biasing force to the second sensor unit 8.

Restriction of movement of the second sensor unit 8 in a direction approaching the piping P in a movable range of the second sensor unit 8 specified by the displacement guiding members 244 in the radial direction of the piping P is achieved by stopper members 242. In other words, the stopper members 242 are disposed coaxially with the bolts 212 adjacently to the nuts 214 of the bolts 212, and specify a limit of approach of the second sensor unit 8 to the piping P. The same applies to the first embodiment (FIG. 3). This configuration may be the same in the configuration including the first sensor unit 6 and the first fitting 202.

In other words, although the first embodiment is the same, the second sensor unit 8 of the second fitting 204 of the second embodiment is displaceable in the radial direction of the piping P with respect to the second fitting 204 and is biased by the disc springs 66 in the direction of coming into press contact with the piping P. The limit of movement of the second sensor unit 8 in a direction of approaching the piping P is specified by the stopper members 242. Accordingly, the constancy of the degree of collapsing the couplant Cp to be interposed between the second sensor unit 8 and the piping P is ensured. The same applies to the relationship between the first fitting 202 and the first sensor unit 6.

The second position regulating portion 206 has a symmetrical shape with the second mother line GL2 interposed therebetween as clearly understood from FIG. 18 and FIG. 19, and has a shape having a pair of molded inclined wing portions extending toward one side and the other side with respect to the second mother line GL2 at a predetermined angle. The second position regulating portion 206 is in contact with the piping P at two positions CL(2) on both sides of the second mother line GL2 at equal distance from the second mother line GL2. Accordingly, the second sensor unit 8 may be aligned with the second mother line GL2, and the second sensor unit 8 may be oriented toward the diameter direction Dm passing through the center of the piping P.

Referring to FIG. 17, the second arm portions 208 which constitute part of the second fitting 204, that is, the punched metal arms, are fixed with the aforesaid pins 64 (FIG. 20) at the center portions thereof in the longitudinal direction. As described above, the second position regulating portion 206 has an elongated shape extending on the second mother line GL2. The second arm portions 208 are coupled to one side edge and the other side edge of the second position regulating portion 206, and the pair of second arm portions 208 are provided with the aforesaid pins 64 installed at symmetrical positions with respect to the second mother line GL2. The second arm portions 208 formed of punched metal have flexibility, and are bendable in the circumferential direction of the piping P. Therefore, the second arm portions 208 may be wound along the peripheral surface of the piping P and in a state of being adjacent to the peripheral surface of the piping P.

Figure 20:
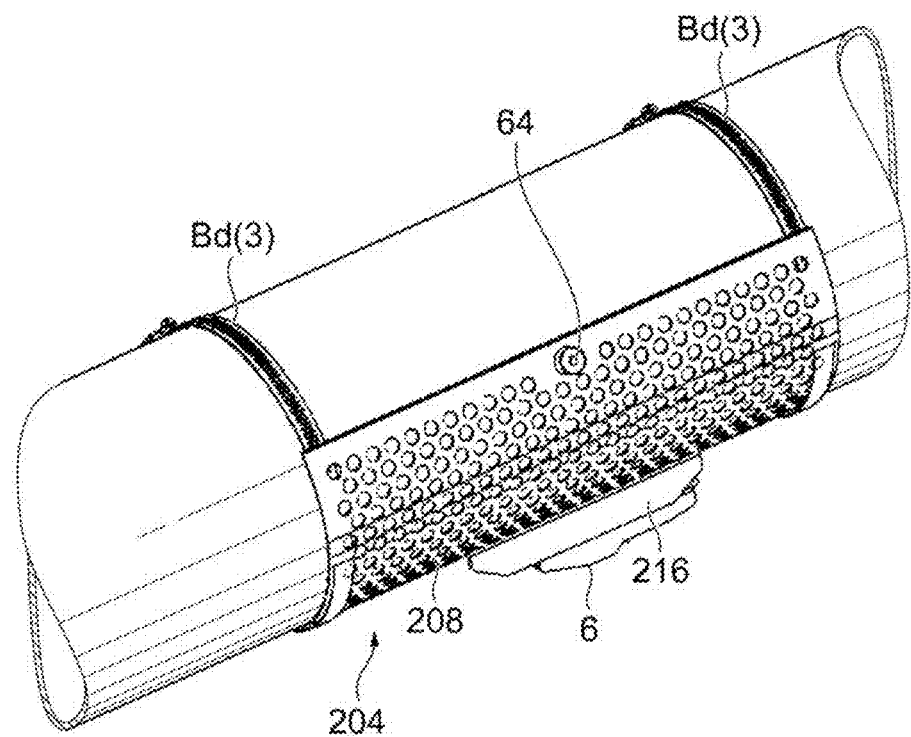
FIG. 20 is a perspective view of the second fitting included in the ultrasonic flow sensor system of the second embodiment attached to the piping.

Metallic bands Bd(3) are attached to one end and the other end of the second arm portions 208 formed of punched metal in the direction of the longitudinal axis Ax(p) of the piping P (FIG. 20). The second fitting 204 may be fixed to the piping P by using these two bands Bd(3).

Figure 22:
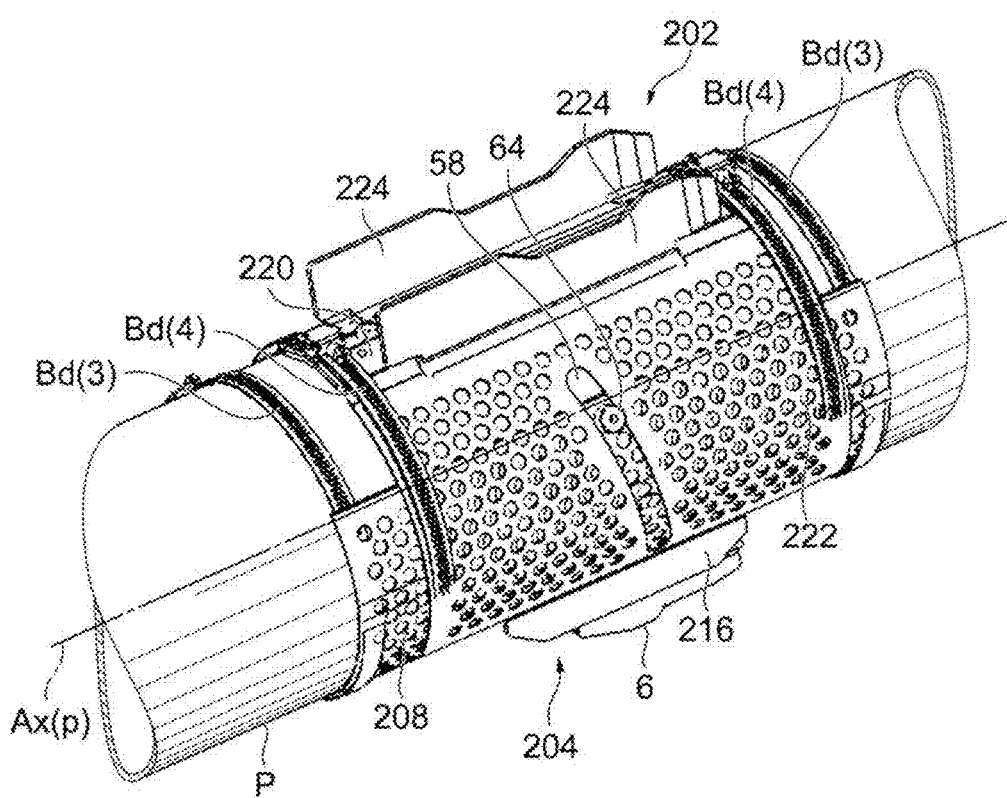
FIG. 22 is an explanatory cross-sectional view illustrating a state in which a first fitting and the second fitting included in the ultrasonic flow sensor system of the second embodiment are attached to the piping.

FIG. 22 is an explanatory drawing illustrating a fitting for installing the first sensor unit 6, that is, the first fitting 202. The configuration of the first fitting 202 is substantially the same as the second fitting 204. A pair of vertical walls 224 of the first fitting 202 correspond to the vertical walls 216 of the aforesaid second fitting 204.

The first fitting 202 includes a first position regulating portion 220 (FIG. 22), and the first position regulating portion 220 corresponds to the second position regulating portion 206 of the second fitting 204. The first fitting 202 includes first arm portions 222, and the first arm portions 222 correspond to the second arm portions 208 formed of the punched metal of the second fitting 204. Metallic bands Bd(4) are attached to one end and the other end of the first arm portions 222 formed of punched metal in the direction of the longitudinal axis Ax(p) of the piping P. The first fitting 202 is fixed to the piping P with two bands Bd(4) in a state in which the first arm portions 222 of the first fitting 202 are overlapped on the second arm portions 208 of the second fitting 204.

The first fitting 202 and the second fitting 204 are different from each other at two points as described below.

(1) The first arm portions 222 of the first fitting 202 are shorter than the second arm portions 208 of the second fitting 204 in the direction in length along the direction of the longitudinal axis Ax(p) of the piping P.

(2) The aforesaid inclined slits 58 are formed on the second arm portions 222 of the first fitting 202, and the pins 64 of the second fitting 204 are arranged in the inclined slits 58.

In the second embodiment as well, the first and second fittings 202 and 204 may provide a function of converting first information to second information by the inclined slits 58 and the pins 64. The first information is information on the diameter of the piping P on which the first and second fittings 202 and 204 are fitted. The second information is information on adequate distance between the first and second fittings 202 and 204 along the direction of the longitudinal axis Ax(p) of the piping P. Therefore, the first and second fittings 202 and 204 are positioned by the inclined slits 58 and the pins at an adequate distance along the direction of the longitudinal axis Ax(p) of the piping P.

The first and second fittings 202 and 204 have a function to position the first sensor unit 6 on the first mother line GL1 (FIG. 12) by a mutual action and on the other hand, position the second sensor unit 8 on the second mother line GL2 (FIG. 12) in the same manner as the ultrasonic flow sensor system 1 in the first embodiment.

The ultrasonic flow sensor system 200 of the second embodiment allows the first and second sensor units 6 and 8 to be installed by using the first and second fittings 202 and 204 in a state in which the operator faces the piping P from one side. The procedure of the operation and contents of the operation are as follows.

(Step 1) Assemble the second sensor unit 8 to the second fitting 204 (FIG. 17).

(Step 2) Provisionally fix the second fitting 204 having the second sensor unit 8 mounted thereon to the piping P in a state in which the operator faces the piping P. This provisional fixation may be performed by using the bands Bd(3) of the second fitting 204. In the state of being provisionally fixed, the second sensor unit 8 is in the state of being biased toward the peripheral surface of the piping P by the disc springs 66 of the second fitting 204.

(Step 3) Rotate the second fitting 204 in the circumferential direction of the piping P to position the second fitting 204 on the opposite side of the piping P when viewed from the operator.

(Step 4) Assemble the first sensor unit 6 to the first fitting 202 in the same manner as the case of the second fitting 204 although FIG. 17 illustrates the second fitting 204.

(Step 5) Provisionally fix the first fitting 202 having the first sensor unit 6 mounted thereon to the piping P in a state in which the operator faces the piping P. This provisional fixation may be performed by using the bands Bd(4) of the first fitting 202 (FIG. 22). In the state of being provisionally fixed, the first sensor unit 6 is in the state of being biased toward the peripheral surface of the piping P by the disc springs 66 of the first fitting 202. The provisional fixation of the first fitting 202 to the piping P brings the first sensor unit 6 to be provisionally positioned on the first mother line GL1, and the second sensor unit 8 to be provisionally positioned on the second mother line GL2 by the cooperation of the inclined slits 58 of the first fitting 202 and the pins 64 of the second fitting 204.

(Step 6) Fix the second fitting 204 to the piping P. Fix the first fitting 202 to the piping P. Accordingly, the first sensor unit 6 is positioned on the first mother line GL1. The second sensor unit 8 is positioned on the second mother line GL2. The first and second sensor units 6 and 8 are placed apart from each other along the direction of the longitudinal axis Ax(p) of the piping P, and the distance is properly adjusted. The first sensor unit 6 is brought into a state being biased toward the peripheral surface of the piping P by the disc springs 66 of the first fitting 202. In the same manner, the second sensor unit 8 is brought into a state being biased toward the peripheral surface of the piping P by the disc springs 66 of the second fitting 204.

As is understood immediately from the description above, the first and second sensor units 6 and 8 may be adequately placed on the piping P in the Z-shaped arrangement while continuing the state in which the operator faces the piping P. In other words, the operator does not have to move around the piping P for assembling the first and second sensor units 6 and 8 adequately to the first and second mother lines GL1 and GL2 facing the diameter direction of the piping P. Therefore, even in the working environment such that a plurality of the piping P are arrayed side by side, the first and second sensor units 6 and 8 may be installed easily.

Figure 23:
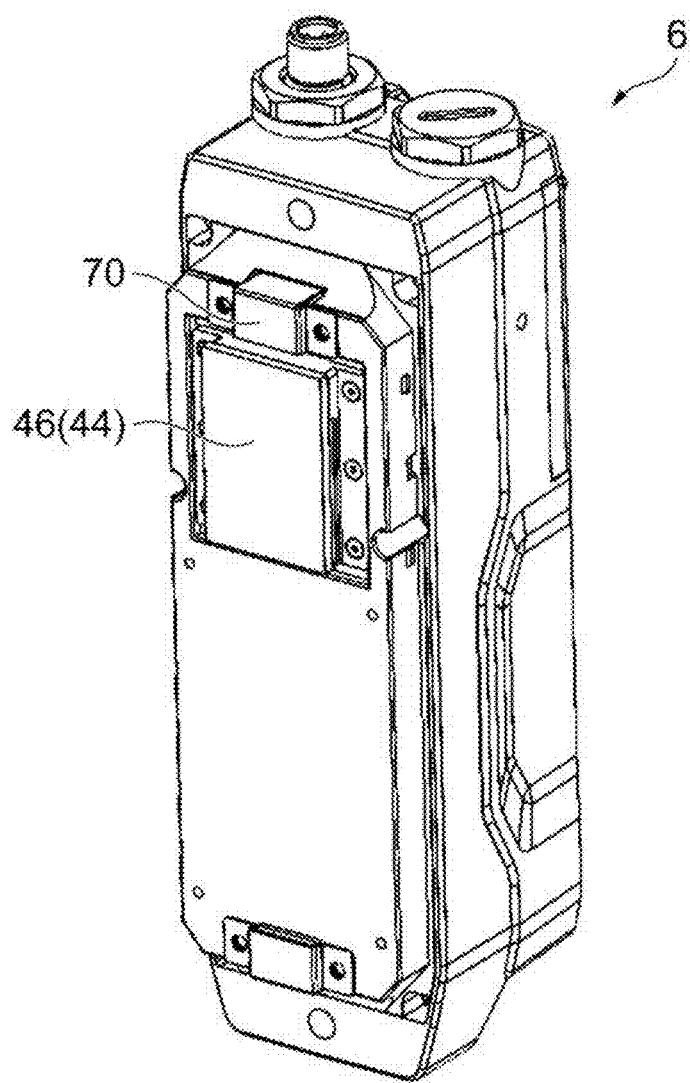
FIG. 23 is a perspective view of a first sensor unit having a temperature sensor assembled thereto viewed from a bottom surface side.
Figure 24:
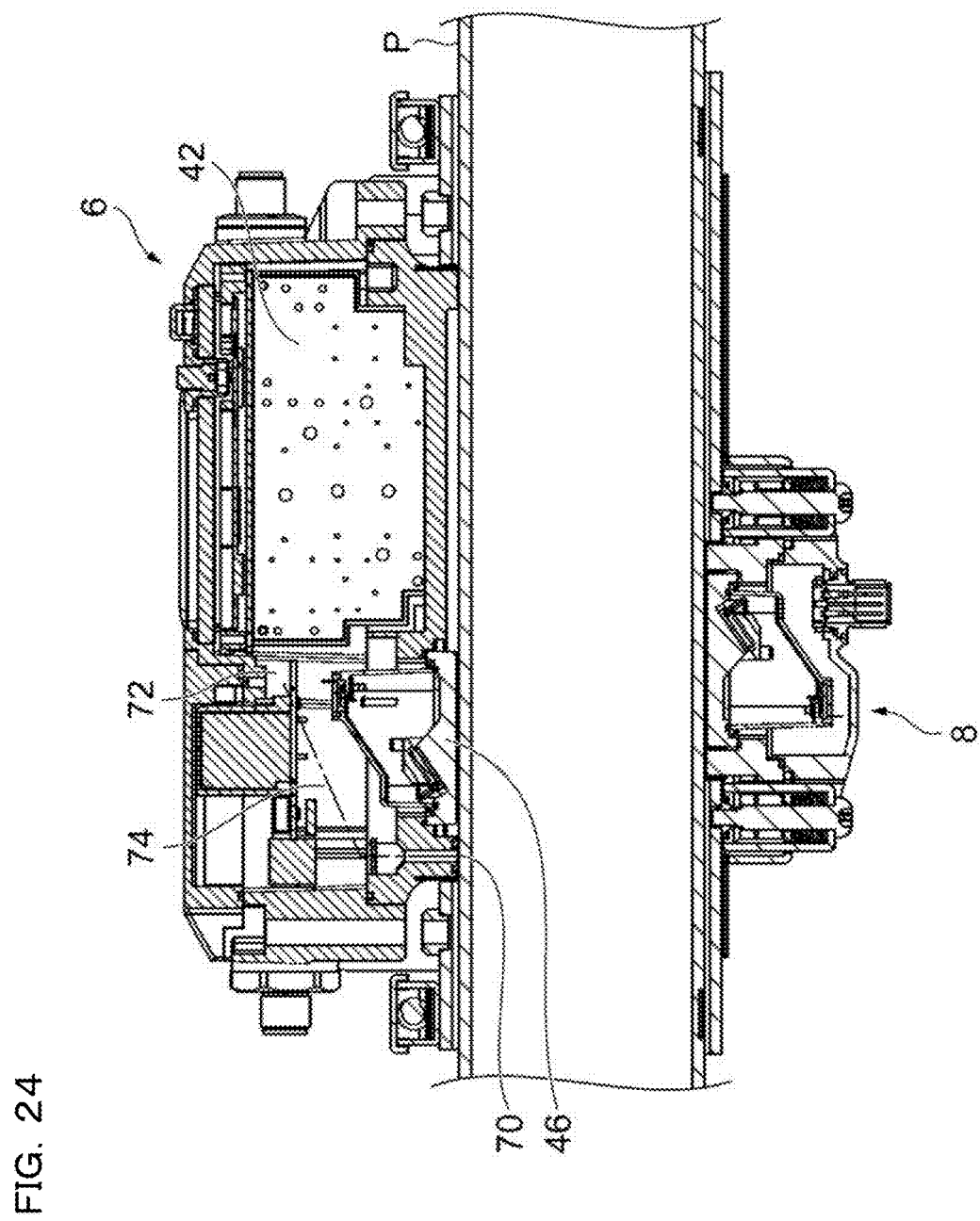
FIG. 24 is an explanatory cross-sectional view illustrating a state in which the ultrasonic flow sensor having the temperature sensor assembled thereto is attached to the piping.

Although the first embodiment and the second embodiment of the invention have been described, the ultrasonic flow sensor included in the invention may include a heat detection surface 70 as illustrated in FIG. 23 and FIG. 24 on a surface coming into contact with the piping P. Although FIG. 23 and FIG. 24 disclose an example in which a heat transfer member, that is, the heat detection surface 70 formed of a molded metallic member is provided on the first sensor unit 6, the heat detection surface 70 may be provided on the second sensor unit 8 instead of the first sensor unit 6. The heat detection surface 70 is disposed adjacent to the first wedge member 46 of the first sensor portion 44 (FIG. 24), and the heat detection surface 70 is brought into press contact with the piping P, so that the temperature of the piping P is detected. A portion around electric wires 74 between the heat detection surface 70 and a temperature detection circuit 72 is resin-potted. Accordingly, dust proof and water proof properties of the first sensor unit 6 are achieved. The heat detection surface 70 preferably has a limited surface area, and a portion around the heat detection surface 70 is preferably formed of a heat insulating material. Accordingly, transfer of periphery heat to the heat detection surface 70 may be prevented while reducing the thermal capacity of the heat detection surface 70. In the first sensor unit 6 provided with the heat detection surface 70, the heat detection surface 70 is configured as a SUS material.

The heat detection surface 70 projects in the direction of coming into press contact with the piping P compared with the first sensor portion 44 (first wedge member 46) positioned adjacent to the heat detection surface 70. The amount of projection is set so that a rubber sheet (elastic solid couplant Cp) interposed between the first sensor portion 44 biased by the disc springs 66 and the piping P is in an adequately compressed state. In other words, the heat detection surface 70 formed of the SUS material limits an amount of collapse of the elastic solid couplant Cp between the first sensor portion 44 and the piping P, which ensures the couplant Cp to adequately function as an acoustic coupling medium. In other words, a sensor surface of the first sensor portion 44 is positioned at a position apart from the piping P by the heat detection surface 70 which comes into contact with the piping P, and the elastic solid couplant Cp is accommodated in a recess formed by the sensor surface and the piping P. Then, the elastic solid couplant Cp is in a state of being compressed in the radial direction of the piping P.

Figure 25:
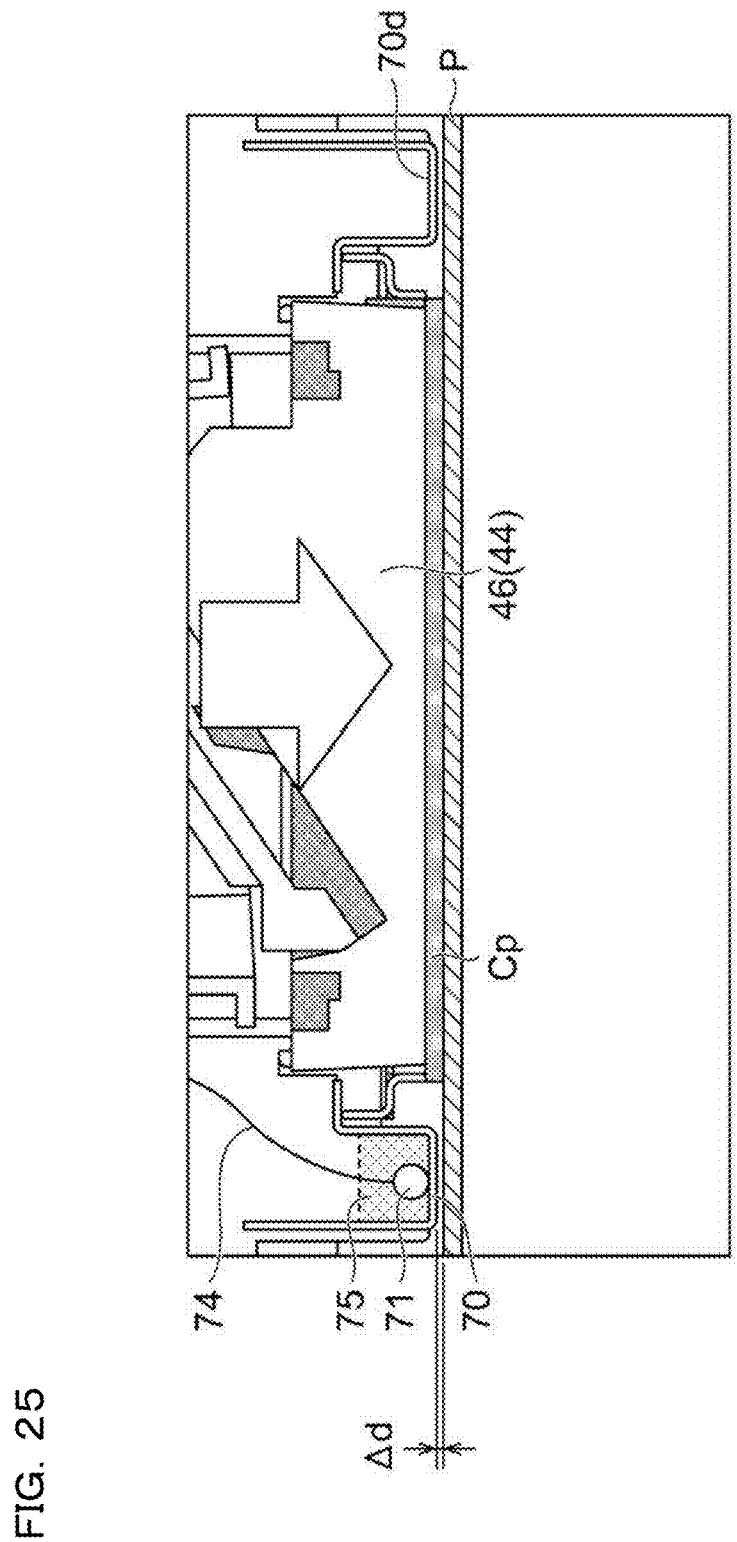
FIG. 25 is an explanatory drawing illustrating a state in which firstly a couplant comes into contact with the piping when the ultrasonic flow sensor having the temperature sensor assembled thereto is attached to the piping.

More specifically, as illustrated in FIG. 25, the solid couplant Cp formed of an elastic member is provided between the first sensor portion 44 and the piping P. The solid couplant Cp has a predetermined thickness. The predetermined thickness has a dimension which generates a gap between the heat detection surface 70 and the piping P at a moment when a surface of the solid couplant Cp comes into contact with the piping P.

Figure 26:
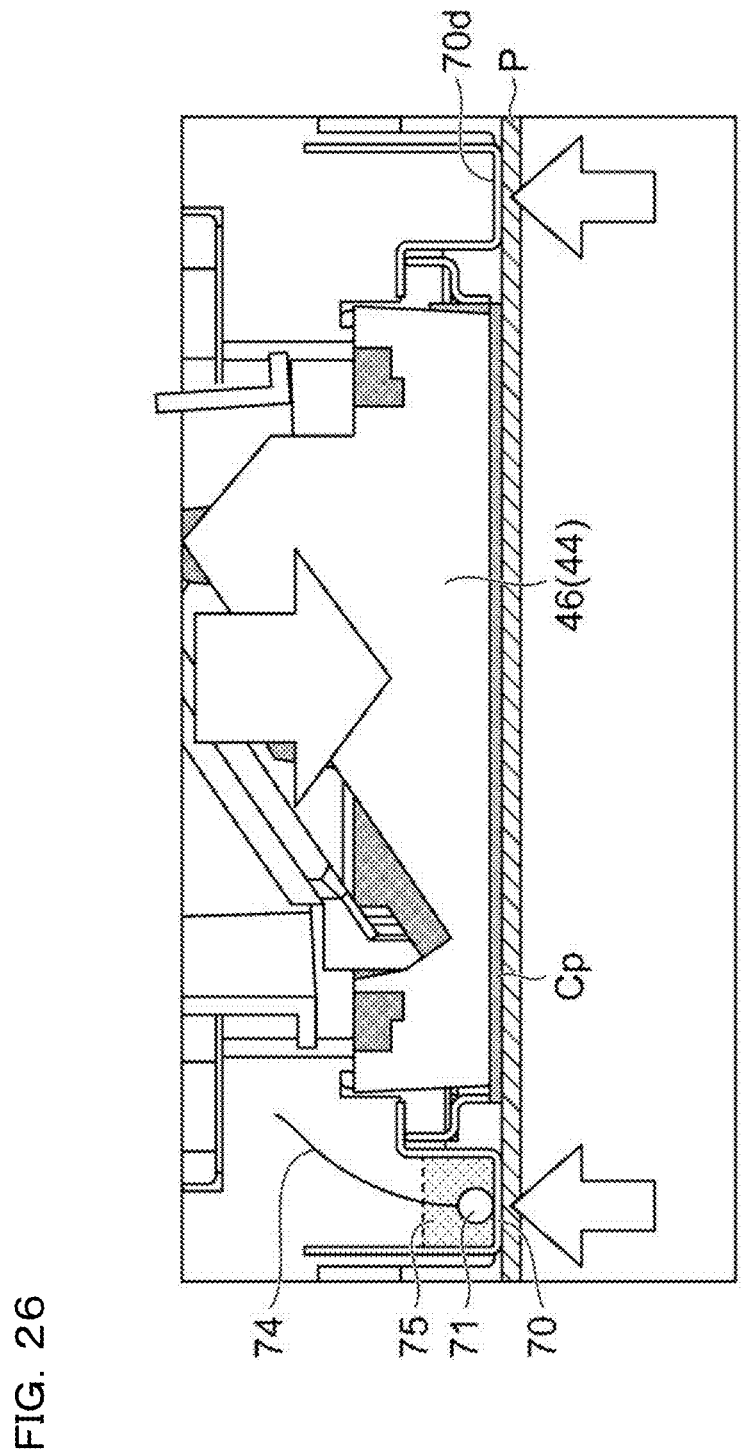
FIG. 26 is an explanatory drawing illustrating a state in which subsequently to FIG. 25, a heat detecting surface comes into contact with the piping in a state in which the couplant is compressed when the ultrasonic flow sensor having the temperature sensor assembled thereto is attached to the piping.

When the first sensor portion 44 is pressed against the piping P, the heat detection surface 70 comes into contact with the piping P as illustrated in FIG. 26. Then, further compression of the solid couplant CP in the radial direction of the piping P is disabled. Therefore, by setting the height of the heat detection surface 70 in the radial direction of the piping P at a predetermined dimension, the amount of collapse of the solid couplant CP is limited. Consequently, the thickness of the solid couplant CP in the state in which the first sensor portion 44 is fixedly positioned on the piping P is determined to be constantly a predetermined thickness in the radial direction of the piping P (FIG. 26).

The state in which the heat detection surface 70 projects will be described further with reference to FIG. 25 and FIG. 26. FIG. 25 illustrates a state of a moment when the couplant Cp comes into contact with the piping P. At this time, a minute gap Δd exists between the metallic member (which functions as an example of "amount of collapse regulating member" in claims) having the heat detection surface 70 and the piping P. In other words, in FIG. 25, when viewing in the radial direction of the piping P, a boundary surface between the wedge member 46 and the couplant Cp, the heat detection surface 70, and a boundary surface between the couplant Cp and the piping are arranged in this order.

In contrast, FIG. 26 illustrates a state in which the first sensor unit 6 is pressed against the piping P by a biasing force of the disc springs 66 and the heat detection surface 70 of the metallic member is brought into contact with the piping P. At this time, as illustrated in FIG. 26, although the couplant Cp is collapsed by a certain amount, the amount of collapse is restricted to a certain amount by contact between the heat detection surface 70 of the metallic member and the piping P. Although the solid couplant Cp which elastically deforms is assumed here, the couplant Cp may be of a liquid state or a gel state.

Reference sign 70d in FIG. 25 and FIG. 26 indicates a dummy of the heat detecting surface. The dummy 70d is located on the opposite side of the heat detection surface 70 with the intermediary of the wedge member 46. The dummy 70d projects toward the piping P by the same amount as the heat detection surface 70. In other words, the dummy 70d and the heat detection surface 70 disposed on both sides of the wedge member 46 along the axial direction of the piping P provide contact surfaces which come into contact with the piping P when fixing the first sensor unit 6 to the piping P so that uniformity of the amount of collapse of the couplant Cp in the axial direction of the piping P, that is, uniformity of restriction of the amount of collapse of the couplant Cp in the radial direction of the piping P is ensured.

The heat detection surface 70 and the dummy 70d may be considered as members for specifying the amount of collapse of the couplant Cp. Referring these members to as "amount of collapse regulating members", in the first and second embodiments, two of the amount of collapse regulating members 70 and 70d may be arranged on both sides of the first and second sensor units 6 and 8 in the axial direction of the piping P in the first and second sensor units 6 and 8 and the first and second fittings 2 (202) and 4 (204) irrespective of heat detection.

As illustrated in FIG. 25 and FIG. 26, a detecting portion 71 of the thermister is in contact with the surface opposite to the heat detection surface 70. The thermister, that is, the temperature detecting device includes, for example, the detecting portion 71 formed of a semiconductor having an electric resistance varying with the temperature change, and two electric wires 74 extending from the detecting portion 71. The electric resistance at the detecting portion 71 is varied with the temperature change. By applying a voltage to the detecting portion 71 via the electric wires 74 and obtaining a current value at that time by an expression (I=V/R), the temperature change of the heat detection surface 70 may be detected. The other ends of the electric wires 74 are connected to the temperature detection circuit 72. In this example, the temperature detection circuit 72 is provided separately from the main substrate 42 (FIG. 3). However, these members may be provided integrally. Alternatively, omitting the temperature detection circuit 72, the electric wires 74 may be soldered to the main substrate 42. The temperature detection circuit 72 detects the temperature of the heat detection surface 70 by applying a voltage to the detecting portion 71 (FIG. 25 and FIG. 26) via the electric wires 74, and detecting a current flowing in the electric wires 74.

Referring to FIG. 25 and FIG. 26, the periphery of the detecting portion 71 of the thermister, that is, the temperature detecting device is resin-potted by a resin 75 (an example of a heat transfer member). The detecting portion 71 of the thermister is sealed with, for example, glass. The detecting portion 71 is ideally in contact with the heat transfer member (molded SUS member) which constitutes the heat detection surface 70. When the detecting portion 71 is moved apart from the molded SUS member, the temperature of the heat detection surface 70 may not be detected with high degree of accuracy. As described above, by solidifying the periphery of the detecting portion 71 of the thermister with the resin 75 (an example of the heat transfer member), the detecting portion 71 is prevented from moving apart from the molded SUS member. For example, even though the detecting portion 71 is separated from the molded SUS member by an impact, the distance of separation may be held small, so that the accuracy of detection of temperature of the heat detection surface 70 may be maintained. As a matter of course, resin potting of the detecting portion 71 of the thermister provides the detecting portion 71 (first sensor unit 6) with effects of dust proof and water proof. In addition, since the resin 75 has heat insulating properties, transfer of heat other than the heat from the heat detection surface 70 is prevented from transferring to the detecting portion 71. Accordingly, the accuracy of detection of the temperature by the heat detection surface 70 may be enhanced.

Figure 27:
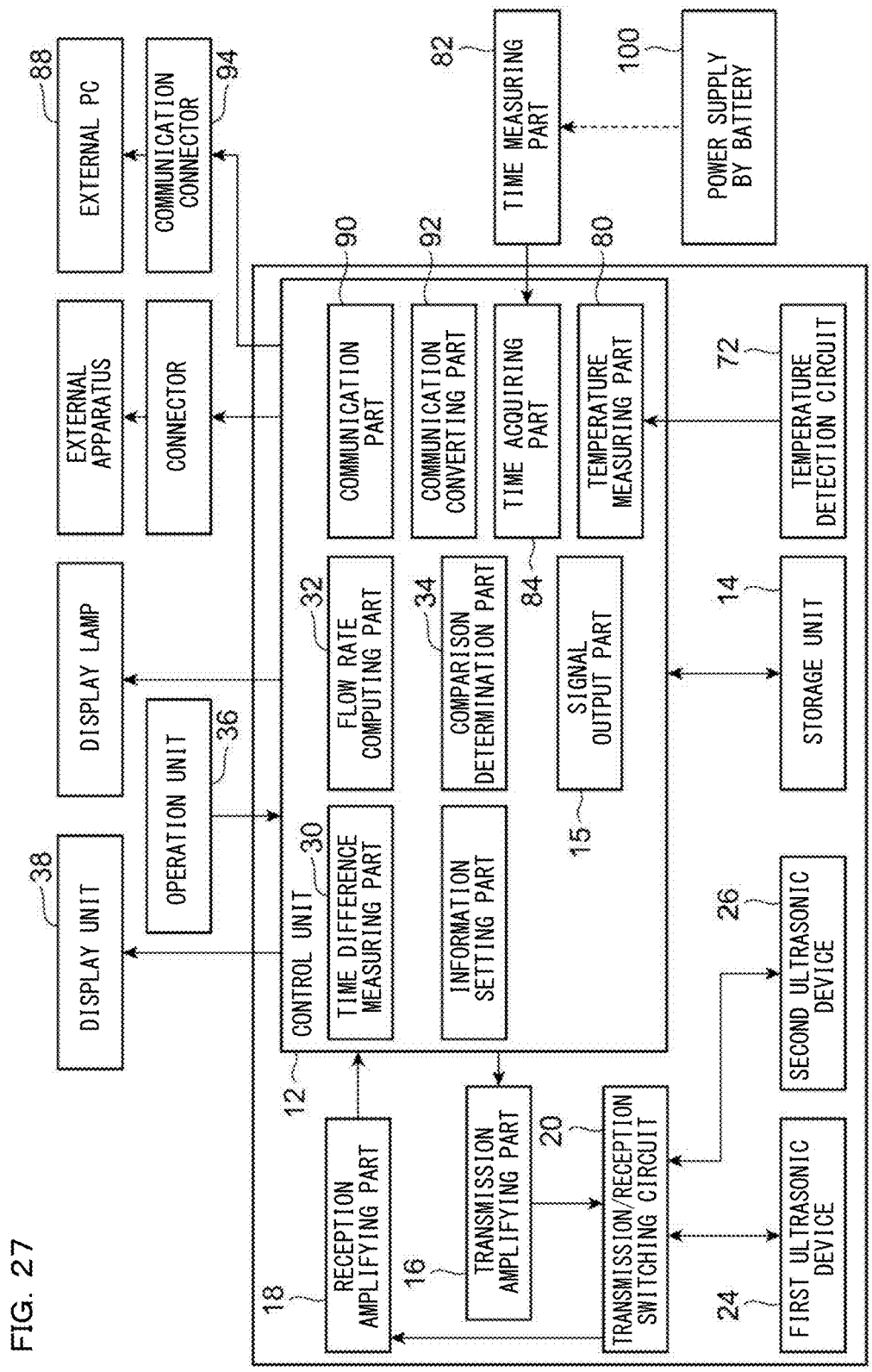
FIG. 27 is a functional block diagram of the ultrasonic flow sensor having the temperature sensor illustrated in FIG. 23 and FIG. 24 assembled thereto.

FIG. 27 illustrates a block diagram of an ultrasonic flow sensor including a circuit configured to detect the temperature of the piping P.

The temperature signal of the piping P detected by the temperature detection circuit 72 is converted into temperature data by a temperature measuring part 80. The temperature data is associated with time data acquired from a time measuring part 82, and is associated with the flow rate flowing in the piping P at the corresponding time. These data is stored in the storage unit 14. The time is preferably an absolute time, and thus power source is supplied to the time measuring part 82 from a battery 100 provided separately. Accordingly, even though the main power source is turned OFF, the time is continuously measured.

An external PC 88 is capable of reading out flow rate data on the fluid in the piping P and the temperature data of the fluid via the piping P via a communication part 90. The data are converted into data of, for example, RS232C by a communication converting part 92, and is output to the external PC 88 via a communication connector 94.

Figure 28:
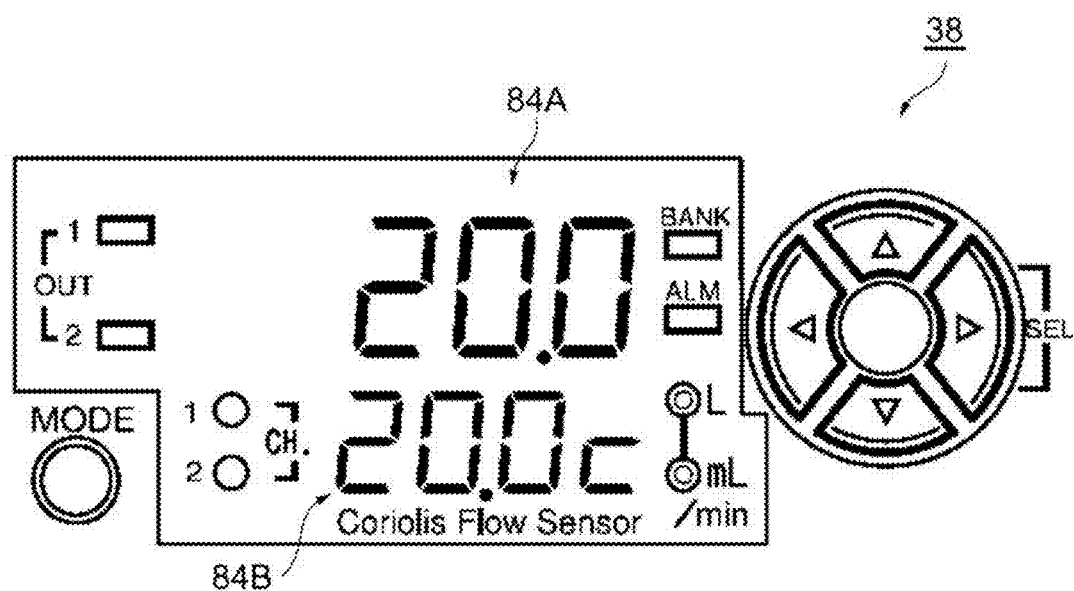
FIG. 28 is an explanatory drawing illustrating an example in which detected temperature and flow rate of the piping are displayed adjacent to each other in a display unit of the ultrasonic flow sensor having the temperature sensor assembled thereto.

FIG. 28 is an explanatory drawing illustrating an example of display on the display unit 38 of the first sensor unit 6. The display unit 38 has two upper and lower display fields, and in the illustrated example, a numerical value 84A (switchable between unit of litter (L) or milliliter (mL)) indicating "20.0", which is the flow rate, is shown on an upper part, and a numerical value 84B (unit of degree of centigrade) indicating "20.0" which is a temperature of the piping P, is shown on a lower part.

As display on the display unit 38, the illustrative combinations may be listed as follows.
(a) "flow rate" and "temperature"
(b) "temperature" and "calorific value (calories)"
(c) "flow rate" and "calorific value (calories)"

The aforesaid calorific value (calories) may be obtained from the fluid temperature, that is, the piping temperature and the flow rate. The aforesaid (a) to (c) are preferably selectable and/or switchable by the user.

As described above, by adding the temperature detecting function to the ultrasonic flow sensor 10, the ultrasonic flow sensor has two functions, namely, a first function as a flow meter and a second function as a thermometer. Therefore, as described above, detection results detected by these first and second functions may be output. In other words, whether or not the coolant flows through the piping P and, if yes, whether a sufficient amount of coolant flows or not may be displayed or may be output to the outside by OK or NG based on the comparison with a predetermined threshold value.

Specifically, with reference to FIG. 27, the control unit 12 includes a memory (not illustrated), and predetermined flow rate threshold values are memorized in the memory. The ultrasonic flow sensor 10 compares the flow rate actually calculated (the detected flow rate) and the predetermined flow rate threshold value, and when the detected flow rate is higher than the flow rate threshold value, determines to be OK by judging that a sufficient flow rate is secured. In contrast, when the detected flow rate is lower than the predetermined flow rate threshold value, the ultrasonic flow sensor 10 determines to be NG by judging that the sufficient flow rate is not secured.

In the first embodiment, the first and second fittings 2 and 4 are both formed of molds and the arm portions 62 and 56 are formed of molded plate members. In contrast, in the second embodiment, the arm portions 222 and 208 of the first and second fittings 202 and 204 are formed of plate members bendable in the circumferential direction of the piping P. For example, a configuration in which the first arm portions 62 of the first fitting 2 of the first embodiment is formed of a bendable plate member, and the first fitting of this modification is combined with the second fitting 4 of the first embodiment may be employed as a modification of the invention. In other words, a configuration in which the arm portion of one of the two fittings is formed of a member bendable in the circumferential direction of the piping P, and the arm portion of the other fitting is formed of a mold is also applicable.

Figure 29:
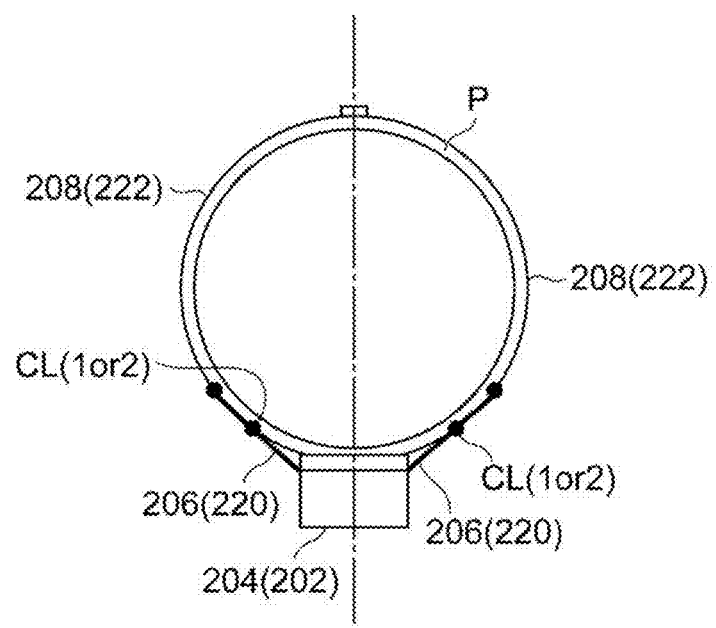
FIG. 29 is an explanatory schematic drawing illustrating a structure of the fitting employed in the second embodiment.
Figure 30:
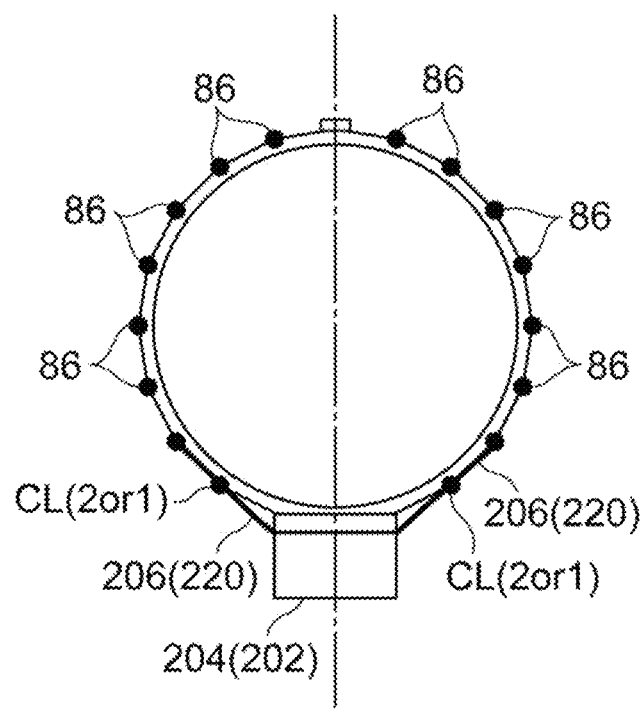
FIG. 30 is an explanatory schematic drawing illustrating a modification of the structure of the fitting employed in the second embodiment.

In the second embodiment, as schematically illustrated in FIG. 29, the arm portions 222 and 208 of the first and second fittings 202 and 204 are formed of plate members bendable in the circumferential direction of the piping P. As a modification, a band member having a multiple joint structure having a plurality of joints 86 in the circumferential direction of the piping P as illustrated in FIG. 30 is also applicable. Known examples of the band having the multiple joint structure include various configuration which includes wrist watch bands.

In the first and second embodiments, a combination of the pins 64 and the inclined slits 58, that is, a method of guiding the pins 64 by the inclined slits 58 is illustrated as the information conversion mechanism. As a modification, a slidable recession/projection fitting between an inclined recessed groove and an inclined projection ridge to be received in the inclined recessed groove may be employed instead of the pins 64 and the inclined slits 58.

Figure 31:
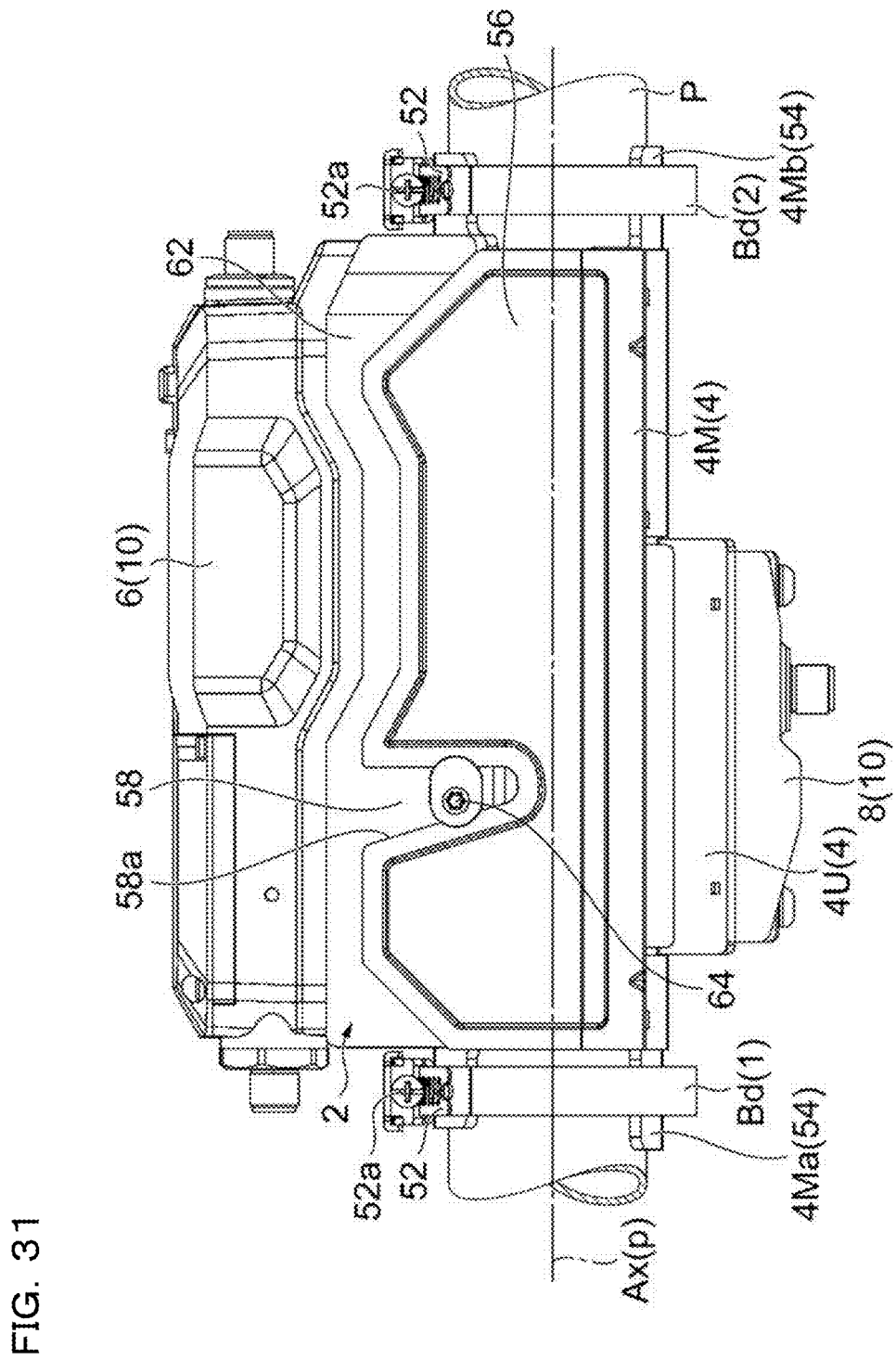
FIG. 31 is an explanatory drawing illustrating a modification relating to a shape of inclined slits included in an information conversion mechanism described with reference to the first embodiment, which corresponds to FIG. 2.

FIG. 31 illustrates a modification of the inclined slit. As will be understood from FIG. 31, the width of the inclined slits 58 may be varied in the longitudinal direction. In this case, one of the inclined edges 58a of the inclined slits 58 constitutes part of the information conversion mechanism described above. The one of the edges 58a is referred to as a "guide edge". Referring now to FIG. 31, attachment of the first and second fittings 2 and 4 to the piping P will be described. After provisional fixation of the first and second fittings 2 and 4 to the piping P, the first and second fittings 2 and 4 are relatively displaced in the longitudinal direction of the piping P, and the pins 64 are brought into abutment with the guide edges 58a of the inclined slits 58. Accordingly, the distance (distance in the direction of the longitudinal axis Ax(p) of the piping P) between the first fitting 2 (first sensor unit 6) and the second fitting 4 (second sensor unit 8) may be properly adjusted. The distance between the first fitting 2 (first sensor unit 6) and the second fitting 4 (second sensor unit 8) may be finely adjusted as needed depending on the difference between the wall thickness of the piping P and the type of the fluid flowing in the piping P. The fine adjustment may be achieved by a degree of movement of the pins 64 toward the guide edges 58a of the inclined slits 58.

What is claimed is:

1. An ultrasonic flow sensor comprising:
   a first ultrasonic device which performs at least one of transmission of ultrasonic waves to a fluid flowing in piping and reception of ultrasonic waves from the fluid flowing in the piping;
   a second ultrasonic device which performs at least the other one of transmission of ultrasonic waves to a fluid flowing in piping and reception of ultrasonic waves from the fluid flowing in the piping; and
   a calculation part configured to calculate a flow rate of the fluid in the piping based on output signals from the first ultrasonic device and the second ultrasonic device, and further comprising:
   a sensor portion including at least one of the first ultrasonic device and the second ultrasonic device integrated therein, and includes a solid-state acoustic coupling member capable of elastic deformation and configured to come into contact with the piping; and
   a fixing member configured to position and fix the sensor portion with respect to the piping,
   wherein the sensor portion includes:
   a heat transfer member having a heat detecting surface configured to come into contact with an outer peripheral surface of the piping when the sensor portion is fixed to the piping by the fixing member and detect heat of the piping;
   a temperature detecting device configured to detect a temperature of heat transferred in the heat transfer member via the heat detecting surface; and
   a temperature measuring part configured to measure the temperature of the heat detecting surface based on a detection signal from the temperature detecting device, and
   wherein the heat transfer member restricts an amount of collapse of the acoustic coupling member in a radial direction of the piping when the sensor portion is fixed to the piping by the fixing member.

2. The ultrasonic flow sensor according to claim 1, wherein part of an outer peripheral surface of the acoustic coupling member coming into contact with the piping is configured to project toward the piping compared with the heat detecting surface of the heat transfer member.

3. The ultrasonic flow sensor according to claim 1, wherein the surface of the acoustic coupling member coming into contact with the piping and the heat detecting surface of the heat transfer member are disposed in a line along an axial direction of the piping.

4. An ultrasonic flow sensor comprising:
   a first ultrasonic device which performs at least one of transmission of ultrasonic waves to a fluid flowing in piping and reception of ultrasonic waves from the fluid flowing in the piping;
   a second ultrasonic device which performs at least the other one of transmission of ultrasonic waves to a fluid flowing in piping and reception of ultrasonic waves from the fluid flowing in the piping; and
   a calculation part configured to calculate a flow rate of the fluid in the piping based on output signals from the first ultrasonic device and the second ultrasonic device, and further comprising:
   a sensor portion including at least one of the first ultrasonic device and the second ultrasonic device integrated therein and opposing the piping via an acoustic coupling member; and a fixing member configured to position and fix the sensor portion with respect to the piping,
   wherein the sensor portion includes: a heat transfer member having a heat detecting surface configured to come into contact with an outer peripheral surface of the piping when the sensor portion is fixed to the piping by the fixing member and detect heat of the piping; a temperature detecting device configured to detect a temperature of heat transferred in the heat transfer member via the heat detecting surface; and a temperature measuring part configured to measure the temperature of the heat detecting surface based on a detection signal from the temperature detecting device, and
   the heat transfer member positions a sensor surface of the sensor portion in a radial direction of the piping when the sensor portion is fixed to the piping by the fixing member.

5. The ultrasonic flow sensor according to claim 4, wherein the sensor surface of the sensor portion is disposed at a position apart from the piping compared with the heat detecting surface of the heat transfer member.

6. The ultrasonic flow sensor according to claim 1, comprising:
   a fitting configured to fit the sensor portion to the peripheral surface of the piping, wherein the fitting includes: a housing portion configured to accommodate the sensor portion, and a position regulating portion configured to come into contact with the outer peripheral surface of the piping on a back side of the housing portion so as to align orientation of the first ultrasonic device with respect to the second ultrasonic device in the axial direction of the piping when viewing in the radial direction of the piping.

7. The ultrasonic flow sensor according to claim 1, wherein the periphery of the heat transfer member is resin-potted.

8. The ultrasonic flow sensor according to claim 1, further comprising a display unit configured to display a temperature measured by the temperature measuring part, wherein the display unit displays a flow rate of the fluid flowing in the piping and a temperature measured by the temperature measuring part adjacent to each other.

9. The ultrasonic flow sensor according to claim 1, further comprising a display unit configured to display a temperature measured by the temperature measuring part wherein the display unit displays a temperature measured by the temperature measuring part and a calorific value adjacent to each other, and the calorific value is obtained from the temperature measured by the temperature measuring part and the flow rate of the fluid flowing in the piping.

10. The ultrasonic flow sensor according to claim 1, further comprising a display unit configured to display a temperature measured by the temperature measuring part wherein the display unit displays a flow rate of the fluid flowing in the piping and a calorific value adjacent each other, and the calorific value is obtained from the temperature measured by the temperature measuring part and the flow rate of the fluid flowing in the piping.

11. The ultrasonic flow sensor according to claim 7, wherein the periphery of the heat detecting surface is surrounded by a heat insulating material.

12. The ultrasonic flow sensor according to claim 1, wherein the heat detecting surface is disposed so as to project in the direction of coming into press contact with the piping compared with the sensor portion of the sensor unit provided with the heat detecting surface, and the amount of collapse of the acoustic coupling member interposed between the sensor portion and the piping is limited by the heat detecting surface.

\* \* \* \* \*